(12) United States Patent
Ayres et al.

(10) Patent No.: US 11,927,765 B2
(45) Date of Patent: Mar. 12, 2024

(54) SKEW MIRROR AUXILIARY IMAGING

(71) Applicant: Akonia Holographics LLC, Longmont, CO (US)

(72) Inventors: Mark R. Ayres, Boulder, CO (US); Adam Urness, Louisville, CO (US); Kenneth E. Anderson, Longmont, CO (US); Friso Schlottau, Lyons, CO (US)

(73) Assignee: Akonia Holographics LLC, Longmont, CO (US)

( * ) Notice: Subject to any disclaimer, the term of this patent is extended or adjusted under 35 U.S.C. 154(b) by 573 days.

(21) Appl. No.: 16/604,131

(22) PCT Filed: Apr. 16, 2018

(86) PCT No.: PCT/US2018/027748
§ 371 (c)(1),
(2) Date: Oct. 9, 2019

(87) PCT Pub. No.: WO2018/194962
PCT Pub. Date: Oct. 25, 2018

(65) Prior Publication Data
US 2020/0159030 A1 May 21, 2020

Related U.S. Application Data

(60) Provisional application No. 62/486,344, filed on Apr. 17, 2017.

(51) Int. Cl.
*G02B 27/01* (2006.01)
*G02B 5/32* (2006.01)
(Continued)

(52) U.S. Cl.
CPC ........... *G02B 27/0179* (2013.01); *G02B 5/32* (2013.01); *G02B 6/4213* (2013.01);
(Continued)

(58) Field of Classification Search
CPC .... G02B 27/0179; G02B 5/32; G02B 6/4213; G02B 6/4215; G02B 27/0172;
(Continued)

(56) References Cited

U.S. PATENT DOCUMENTS

| 7,418,170 B2 | 8/2008 | Mukawa et al. |
| 7,502,168 B2 | 3/2009 | Akutsu et al. |

(Continued)

FOREIGN PATENT DOCUMENTS

| CN | 104570353 A | 4/2015 |
| CN | 104656259 A | 5/2015 |

(Continued)

*Primary Examiner* — Dmitriy Bolotin
(74) *Attorney, Agent, or Firm* — Michael H. Lyons

(57) ABSTRACT

Optical systems for performing gaze tracking and imaging an external scene are disclosed. An example optical system may include light sources for emitting visible and non-visible light. The optical system may include a waveguide that is operatively coupled to the light sources. A volume holographic light coupling element may be disposed between the surfaces of the waveguide. The volume holographic light coupling element may include a grating medium and a first volume holographic grating structure within the grating medium. In some examples, the first volume holographic grating structure may be configured to reflect non-visible light of a first wavelength about a first reflective axis offset from a surface normal of the grating medium at a first incidence angle. The optical system may also include an optical filter. Another example optical system may include an imaging device that is configured to receive the light external to the optical system.

16 Claims, 8 Drawing Sheets

(51) Int. Cl.
   *G02B 6/42*    (2006.01)
   *G02B 27/28*   (2006.01)
   *G03H 1/02*    (2006.01)
   *G06F 3/01*    (2006.01)

(52) U.S. Cl.
   CPC ....... *G02B 6/4215* (2013.01); *G02B 27/0172* (2013.01); *G02B 27/283* (2013.01); *G03H 1/0248* (2013.01); *G06F 3/013* (2013.01); *G02B 2027/0138* (2013.01); *G02B 2027/014* (2013.01); *G02B 2027/0174* (2013.01); *G02B 2027/0187* (2013.01)

(58) Field of Classification Search
   CPC .......... G02B 27/283; G02B 2027/0138; G02B 2027/014; G02B 2027/0174; G02B 2027/0187; G03H 1/0248; G06F 3/013
   See application file for complete search history.

(56) References Cited

U.S. PATENT DOCUMENTS

| | | | |
|---|---|---|---|
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 10,317,679 B2* | 6/2019 | Ayres | G02B 27/14 |
| 10,553,139 B2* | 2/2020 | Bohn | G09G 3/02 |
| 11,009,704 B2* | 5/2021 | Ayres | G02B 6/005 |
| 11,119,261 B1* | 9/2021 | Ayres | G02B 27/44 |
| 11,262,587 B2* | 3/2022 | Rubin | G06T 19/006 |
| 2004/0196399 A1* | 10/2004 | Stavely | H04N 5/23219 348/333.01 |
| 2013/0250430 A1 | 9/2013 | Robbins et al. | |
| 2014/0140654 A1 | 5/2014 | Brown et al. | |
| 2015/0138451 A1* | 5/2015 | Amitai | G02B 27/0179 349/11 |
| 2015/0277126 A1 | 10/2015 | Hirano et al. | |
| 2016/0041384 A1 | 2/2016 | Robbins et al. | |
| 2016/0154150 A1 | 6/2016 | Simmonds et al. | |
| 2016/0357016 A1* | 12/2016 | Cakmakci | G02B 27/0172 |
| 2016/0370583 A1* | 12/2016 | Saarikko | G02B 6/34 |
| 2017/0031160 A1 | 2/2017 | Popovich et al. | |
| 2017/0059759 A1 | 3/2017 | Ayres et al. | |
| 2017/0276940 A1 | 9/2017 | Popovich et al. | |
| 2018/0130391 A1* | 5/2018 | Bohn | G02B 27/0172 |
| 2019/0086674 A1* | 3/2019 | Sinay | G02B 27/0172 |
| 2019/0094981 A1 | 3/2019 | Bradski et al. | |
| 2020/0117003 A1* | 4/2020 | Pfeiffer | G02B 6/4214 |
| 2020/0192101 A1* | 6/2020 | Ayres | G02B 6/0055 |

FOREIGN PATENT DOCUMENTS

| | | | | |
|---|---|---|---|---|
| JP | H05-154106 A | 6/1993 | | |
| JP | 2008058777 A | 3/2008 | | |
| JP | 2009145513 A | 7/2009 | | |
| JP | 2015096883 A | 5/2015 | | |
| JP | 2015132821 A | 7/2015 | | |
| JP | 2016506562 A | 3/2016 | | |
| KR | 1020130000401 A | 1/2013 | | |
| KR | 1020150073853 A | 7/2015 | | |
| KR | 20160102481 A | 8/2016 | | |
| WO | 2015012280 A1 | 1/2015 | | |
| WO | 2016135375 A1 | 9/2016 | | |
| WO | WO-2016135375 A1 * | 9/2016 | ............. | A61B 3/113 |
| WO | 2017035283 A1 | 3/2017 | | |
| WO | 2017060665 A1 | 4/2017 | | |

* cited by examiner

SKEW MIRROR AUXILIARY IMAGING

This application claims priority to provisional patent application No. 62/486,344, filed on Apr. 17, 2017, which is hereby incorporated by reference herein in its entirety.

FIELD OF TECHNOLOGY

The present disclosure relates generally to optical reflective devices, and more specifically to performing eye tracking and image detection within optical reflective devices.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal (i.e., the reflective axis is perpendicular to the mirror surface). Because of this constraint on the reflective axis, a dielectric mirror is disposed in some devices in a configuration that is suboptimal. Similarly, the reflective axis being constrained to surface normal makes a dielectric mirror inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light may avoid the constraint inherent in conventional mirrors that the reflective axis coincide with surface normal. However, where a substantially constant reflective axis is required, a conventional grating structure is substantially limited to a single wavelength (or very narrow range of wavelengths) for a given angle of incidence. Similarly, in order to reflect light of a specified wavelength about a constant reflective axis, a conventional grating structure is limited to a single angle of incidence (or very narrow range of incidence angles).

Accordingly, conventional reflective devices comprising reflective grating structures or conventional mirrors may be inadequate for certain applications SUMMARY The described features generally relate to one or more methods, systems, or devices for directing and reflecting auxiliary input light and reflections in optical systems or devices comprising grating structures. The methods, systems, or devices may employ selective coupling techniques to allow a holographic optical element (e.g., a skew mirror or like optical element using skew mirror technology) to diffract or reflect light to one or more optical paths of the optical system. An example optical system may include a TIR waveguide including grating structures in a grating medium. The grating medium may include volume holographic grating structures having reflective properties to provide an external exit pupil projection (e.g., external to the TIR waveguide toward a user's eye) of in-coupled light. The exit pupil may comprise one or more light modes spanning both visible light and non-visible light wave spectra. The optical system may be configured to detect a reflected image of the non-visible light and determine a position a user's eye with respect to an area of the TIR waveguide.

Additionally or alternatively, an optical system may include a TIR waveguide including grating structures in a grating medium. The grating medium may include volume holographic grating structures having reflective properties to in-couple light (e.g., one or more input or entrance pupils) of an external scene (e.g., an external scene viewable by a user through the TIR waveguide) for reciprocal point of view imaging of the optical system. In other words, the surrounding light of the system corresponding to an external point of view of a user may be in-coupled and recorded to capture a reciprocal image of the external point of view.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
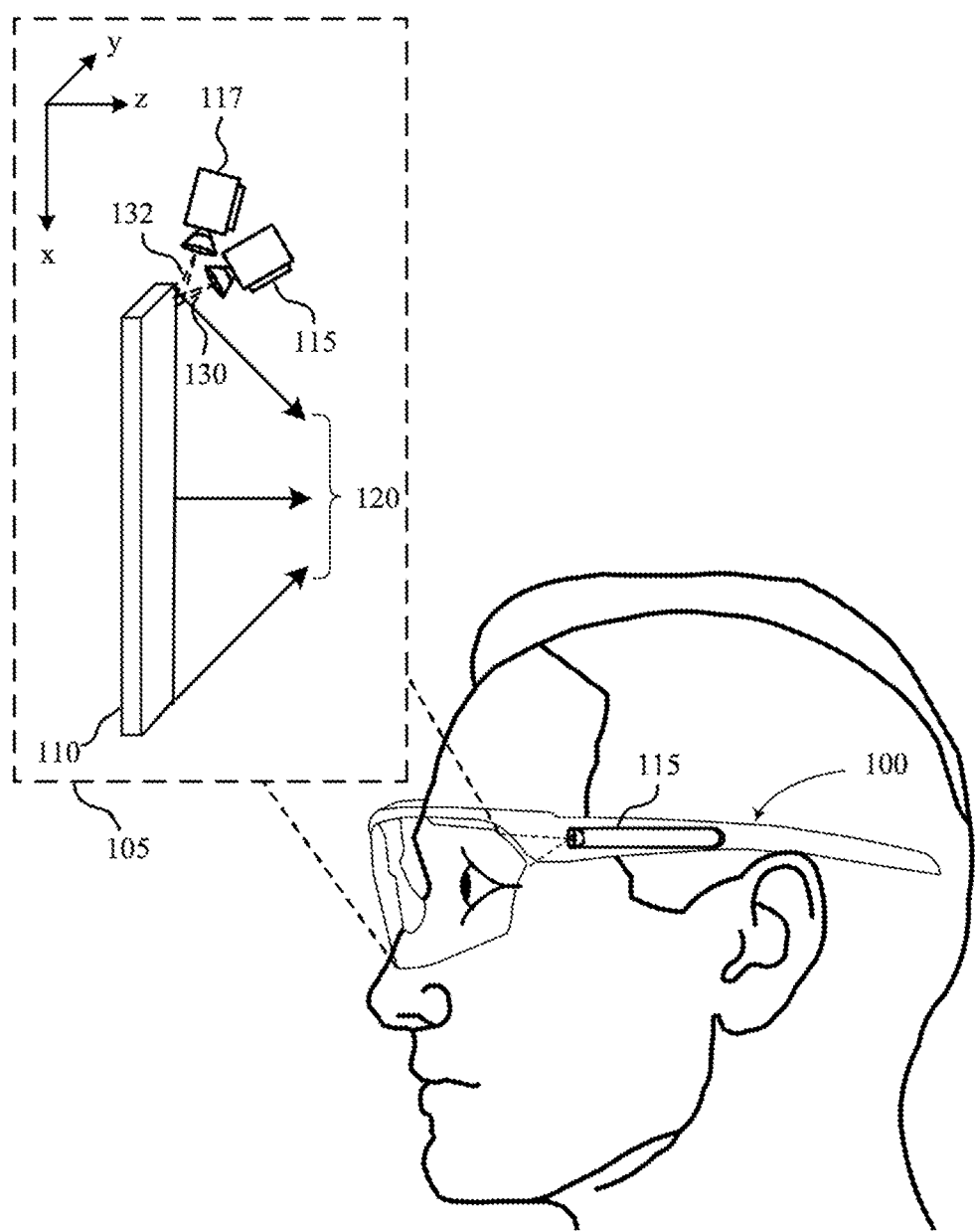
FIG. 1 is a diagram of an illustrative HMD device in accordance with an embodiment.

Conventional reflective devices, such as diffractive grating structures or conventional mirrors, may be inadequate for certain applications, for example, where light is to be reflected about a reflective axis not constrained to surface normal and where an angle of reflection is to be constant across a range of incidence angles and/or specific wavelengths of light. Furthermore, conventional structures and coupling components of a conventional reflective device may interact with light of the device (e.g., with total internal reflection (TIR) mode reflected light and non-TIR straight through external light) and impede optical clarity of an image projection and/or external scene. Such results may be particularly acute in head mounted display (HMD) devices that include eye or gaze tracking and external scene image detection functions.

In order to mitigate these issues, volumetric holographic gratings (VHGs) may be used in an optical system. For example, volumetric holographic gratings may be used as a light coupling device or element (e.g., an input coupler, an output coupler, and/or a cross coupler) within a waveguide of an optical system. Waveguide implementation techniques without volumetric holographic gratings may be limited in performing auxiliary functions of the waveguide. For example, a TIR waveguide that includes VHGs applied using skew-mirror technology may allow for an external viewing classification (e.g., viewing direction/angle, viewing object identification) and reciprocal imaging of an external point of view. These VHGs may be implemented in grating mediums of various light coupling devices for directing emitted, and subsequently reflected, non-visible light of wavelengths (e.g., infrared (IR) light or near IR (NIR) light) distinct from wavelengths of the visible light spectrum (e.g., red, green, blue light). The reflected non-visible light may be detected by a detector to determine external gaze characteristics (e.g., determining an image of a user's pupil that corresponds to a viewing location of on the TIR waveguide). Additionally or alternatively, VHGs may be implemented in grating mediums of various light coupling devices for directing external scene light to a detector for determining an external point of view.

Utilizing volume holographic grating technology (e.g., skew mirror technology) in the one or more light coupling devices of an optical system, such as a near-to-eye display (NED), may improve viewing capability and optical clarity of an associated image projection and/or image recording. A skew mirror type optical coupling device within a TIR waveguide may exhibit achromatic characteristics and may be Bragg-mismatched to one or more TIR modes of input light that are reflected between substrates of the TIR waveguide. The skew-mirror type optical coupling device may also be Bragg-mismatched to input light passing straight through the TIR waveguide (e.g., external light incident on a substrate surface). Thus, an optical system utilizing skew mirror technology may provide appropriate reflective grating structures for performing eye tracking and image detection. Additionally, utilizing skew mirror technology in a may avoid impedances to optical clarity in comparison to an image projection device using conventional coupling elements, particularly between non-visible spectrum light and display light of the image projection. By contrast, some conventional coupling devices used in a waveguide may be limited in performing such auxiliary imaging functions. For example, in-coupled light of an image projection may be interspersed with passing visible light of the waveguide, thereby promoting obstruction to determining an external viewing classifications and obtaining reciprocal imaging of an external point of view.

In some examples of the subject technology, one or more skew mirror type components or devices (e.g., a filter and an output coupler) may guide input light emitted from one or more light sources of an optical system. Input light may include non-visible light (e.g., IR or NIR light) for eye gaze tracking, as well as visible light of the image projection (e.g., display light) and an external scene. An optical path used to direct visible image projection light from a micro display may also be used to direct the non-visible light used for illumination an eye of a user. The optical path may additionally be used to direct a reflected image of the eye of the user to a detector of a gaze tracking imaging device (e.g., an IR or NIR camera). A filter included in the optical path may be configured to pass visible light through the filter and toward an entrance aperture associated with a TIR waveguide. The filter may reflect non-visible light from a non-visible light source different from the micro display toward the entrance aperture. The entrance aperture may be configured to provide an entrance pupil to the TIR waveguide. Additionally, the filter may also reflect non-visible light propagating back through the entrance aperture (e.g., the non-visible light image of the eye of the user reflected back toward the entrance aperture) toward the detector of the gaze tracking imaging device. In this manner, the filter may allow the non-visible returning reflected light to be separated from the visible image projection display light.

The TIR waveguide may direct the visible and non-visible light from the entrance aperture to a grating medium disposed between one or more surfaces of the TIR waveguide. In some examples, one or more skew mirror type components or devices (e.g., a cross coupler embodiment) may guide input light from the entrance aperture and reflect the input light for propagation through the TIR waveguide in a direction different from a propagating TIR mode of the input light entering the entrance aperture. A cross coupler embodiment may advantageously allow a dimension (e.g., a vertical or a horizontal dimension) of the projected image to remain unguided throughout the entrance-to-exit pupil optical path (i.e., a projected dimension may correspond to angles transverse to the TIR dimension). The TIR waveguide may include a skew mirror type output coupler that allows for out-coupling of the propagated visible and non-visible light to an eye box of the optical system for external display of the visible light and reflection of the non-visible light on the eye of the user.

Additionally, the skew mirror type output coupler may also allow for in-coupling of a reflected image of the non-visible light (e.g., a reflection from the eye of the user). The optical system may determine a directional and/or angular offset of the reflected image (e.g., an optical gaze) with respect to an external field of view (FOV) at a reference orientation of the optical system. The portion of the optical path from the non-visible light source and/or detector of the gaze tracking imaging device to the filter may include one or more birefringent material components. For example, the portion of the optical path from the non-visible light source and/or detector of the gaze tracking imaging device to the filter may include may include a quarter wave plate (QWP) and a polarized beam splitter (PBS). The QWP and PBS may be included for separating illuminating and reflected non-visible light.

In some examples of the subject technology, a skew mirror type coupler (e.g., an output coupler) may provide additional functionality within an optical system by in-coupling a portion of external scene light (e.g., environmental light surrounding the optical system, particularly a lens portion of the optical system). The in-coupled external light may be substantially representative of an external point of view of a user of the optical system. One or more grating structures of a grating medium within a TIR waveguide may selectively reflect the incident external light toward a scene imaging device (e.g., a camera device) of the optical system. The scene imaging device may record a reciprocal image corresponding to the external point of view. Mechanisms (e.g., filters, dichroic elements, functionality of a processor, etc.) of the optical system may be employed by the scene imaging device and/or optical system as a whole to rebalance the dim in-coupled external light for accurate detection of the reciprocal image. For example, image information corresponding to image projected light may be provided to the scene imaging device to remove the any remaining image projected light that is propagated to the scene imaging device along with the in-coupled external light.

Specific examples are described for a grating medium including one or more grating structures. A grating structure may be configured to reflect light, of a particular wavelength, about a reflective axis offset from a surface normal of the grating structure at a particular plurality of incident angles. This description provides examples, and is not intended to limit the scope, applicability or configuration of implementations of the principles described herein. Rather, the ensuing description will provide those skilled in the art with an enabling description for implementing implementations of the principles described herein.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of an electronic device such as HMD device 100 in which the principles included herein may be implemented. The HMD device 100 may include eyewear or headwear in which a NED 105 may be affixed in front of a user's eyes. The NED 105 may include a diffractive element portion disposed within or incorporated with a lens assembly of the HMD device 100. In some examples, the diffractive element portion may be a holographic optical element (HOE), which may include a skew mirror 110. Skew mirror 110 may be used in forming a light coupling element (e.g., a volume holographic light coupling element including one or more volume holographic grating structures). Coordinates (X, Y, and Z-axis) are provided with reference to the skew mirror 110. The HMD device 100 may include multiple light coupling elements including additional skew mirrors (not shown), HOEs not structured using skew mirror technology and principles (not shown), DOEs (not shown), and/or louvered mirrors (not shown) assembled with the skew mirror 110. The HMD 100 may also include a light source or light projector 115 operatively coupled to the lens assembly. In some examples, visible light source or light projector 115 and a non-visible light source or light projector 117 may be operatively coupled to the lens assembly in a waveguide configuration. In some examples, light sources or light projectors 115, 117 may be operatively coupled to the lens assembly in a free space configuration. In some examples (e.g., for gaze tracking embodiments), non-visible light source or light projector 117 may emit IR or NIR light. In other examples, non-visible light source or light projector 117 may be omitted.

The skew mirror 110 may be a reflective device and may include a grating medium within which resides one or more volume holograms (sometimes referred to herein as volume holographic grating structures) or other grating structures. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, may have physical properties that allow the medium to diffract light about an axis, referred to as a reflective axis, where the angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations may have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram is a recording of an interference pattern including both intensity and phase information from the light used for the recording. This information may be recorded in a photosensitive medium that converts the interference pattern into an optical element that modifies the amplitude or the phase of subsequent incident light beams, according to the intensity of the initial interference pattern. The grating medium may include a photopolymer, photorefractive crystals, dichromatic gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. At the intersection of the recording beams, the recording beams may interact with the recording medium in a way that varies according to the intensity of each point of the interference pattern, and creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. In some instances, grating mediums have been rendered non-photosensitive.

In some implementations, the volume holographic grating structure may include a hologram generated via interference between multiple light beams referred to as recording beams. Skew mirror 110 (e.g., the volume holographic light coupling element formed from skew mirror 110) may include multiple holograms (e.g., multiple volume holographic grating structures). The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed)), and/or using recording beams whose positions vary among the multiple holograms (i.e., spatially multiplexed). In some implementations, the volume holographic grating structure may include a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Visible light projector 115 may provide image-bearing light to the lens assembly, and non-visible light projector 115 may provide IR or NIR light to the lens assembly. In some instances, the lens assembly and skew mirror may be substantially flat with respect to an orientation plane of the system. In other instances, the lens assembly may exhibit curvature with respect to an orientation plane. For example, in some cases, lens assembly and skew mirror 110 may be substantially flat with respect to the X-Y plane. In other cases, the lens assembly may include some curvature with respect to the X-Y plane in certain implementations. Reflected light 120 from skew mirror 110 may be reflected towards an eye box situated at a fixed distance along the Z-axis away from skew mirror 110. In some examples, skew mirror 110 may be contained at least partially within a waveguide. The waveguide may propagate incident visible light 130 and incident non-visible light 132 by total internal reflection towards the skew mirror 110. In some examples, incident light 130, 132 may propagate by free space towards skew mirror 110. Other components (not shown in FIG. 1) may be included in one or more optical paths associated with light projectors 115, 117 including but not limited to projection optics, a filter, a QWP, a PBS, a gaze tracking imaging device. In some examples, other components (not shown in FIG. 1) may be operatively coupled to the lens assembly such as, but not limited to, a filter and a scene imaging device (e.g., for external scene image detection embodiments).

The skew mirror 110 may include a grating medium made of a photopolymer. The skew mirror 110 may also include one or more volume holographic grating structures within the grating medium. Each volume holographic grating structure may include one or more sinusoidal volume gratings which may overlap with each other. A volume holographic grating structure may be configured to reflect light of a particular wavelength about a reflective axis offset from a surface normal of the grating medium at a particular plurality of incidence angles. Each volume holographic grating structure within the grating medium may be configured to reflect a portion of light toward an exit pupil in the eye box at a fixed distance from the waveguide.

Each volume holographic grating structure (sometimes referred to herein simply as "grating structures" for the sake of simplicity) may reflect light in a manner different from another volume holographic grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a range of incidence angles. The different grating structures may be super-imposed within the grating medium of the skew mirror 110. The skew mirror 110 may have a substantially constant reflective axis (i.e., each grating structure of the skew mirror 110 has a same substantially constant reflective axis).

In some examples, an HMD may include a light source configured to emit IR or NIR light as well as a light source configured to emit visible light. The visible light may correspond to image-bearing light. A TIR waveguide may be operatively coupled to the both light sources, and the TIR waveguide may include a first waveguide surface and a second waveguide surface. A volume holographic light coupling element may be disposed between the first waveguide surface and the second waveguide surface. The volume holographic light coupling element may include a grating medium and a first volume holographic grating structure within the grating medium. The first volume holographic grating structure may be configured to reflect IR or NIR light of a first wavelength about a first reflective axis offset from a surface normal of the grating medium at a first incidence angle. The volume holographic light coupling element may also include a second volume holographic grating structure within the grating medium. The second volume holographic grating structure may be being configured to reflect light of a second wavelength about a second reflective axis offset from the surface normal of the grating medium at a second incidence angle different from the first incidence angle. The second wavelength may be one of a visible red light wavelength, a visible green light wavelength, or a visible blue light wavelength. The light of the second wavelength may correspond to the image-bearing light of the light source configured to emit visible light.

Figure 2A:
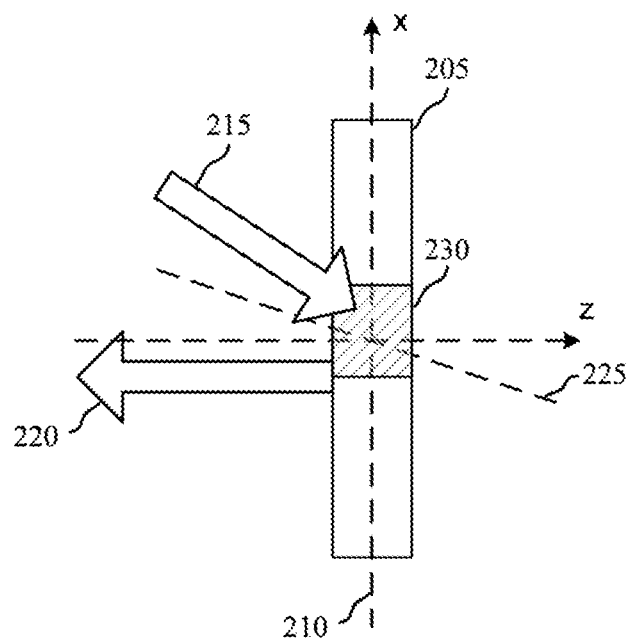
FIG. 2A is a diagram illustrating reflective properties of an illustrative volume holographic grating structure such as a skew mirror in real space in accordance with an embodiment.

FIG. 2A is a cross-section view 200-a illustrating reflective properties of a skew mirror 205 in real space according to one example (e.g., a free-space configuration as opposed to a waveguided configuration in which the skew mirror is incorporated into a waveguide). The cross-section view 200-a may include a volume holographic grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror may be partially reflective. In this manner, one or more skew mirrors may be configured or structured to selectively reflect the rays of light to various portions of an optical device (e.g., redirecting light toward an entrance aperture of a waveguide in a filter configuration, redirecting light toward a waveguide in an input coupler configuration, redirecting light propagating in a TIR mode within an waveguide in a cross coupler configuration, and/or forming an exit pupil towards an eye box of the optical device). When pupil equalization techniques are employed, a skew mirror may be configured to avoid reflecting the rays of light for certain incidence angles, where such a reflection would reflect the rays of light to an area that is not toward a desired location (e.g., the exit pupil). Implementations of some skew mirror embodiments may require a relatively high dynamic range recording medium to achieve high reflectivity over a relatively wide wavelength bandwidth and angle range for the resulting grating medium. By contrast, a skew mirror utilizing pupil equalization techniques may require less dynamic range thereby allowing each hologram to be stronger (e.g., recorded with a greater intensity and/or longer exposure time). A skew mirror composed of stronger holograms may provide a brighter image, or allow a dimmer light projector to provide an image of similar brightness. The skew mirror 205 may be characterized by reflective axis 225, at an angle measured with respect to the Z-axis. The Z-axis may be normal to the skew mirror surface. The skew mirror 205 is illuminated with the incident light 215 with an internal incidence angle that is measured with respect to the Z-axis. The principal reflected light 220 may be reflected with internal reflection angle 180° measured with respect to the Z-axis. The principal reflected light 220 may correspond to wavelengths of light residing in the red, green, and blue regions of the visible spectrum.

The skew mirror 210 may be characterized by the reflective axis 225, at an angle measured with respect to the Z-axis. The Z-axis is normal to the skew mirror axis 205. The skew mirror 210 is illuminated with the incident light 215 with an internal incidence angle that is measured with respect to the Z-axis. The principal reflected light 220 may be reflected with internal reflection angle substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., IR and NIR wavelengths). In some cases, the skew mirror 210 may have multiple hologram regions which all share substantially the same reflective axis 225.

Figure 2B:
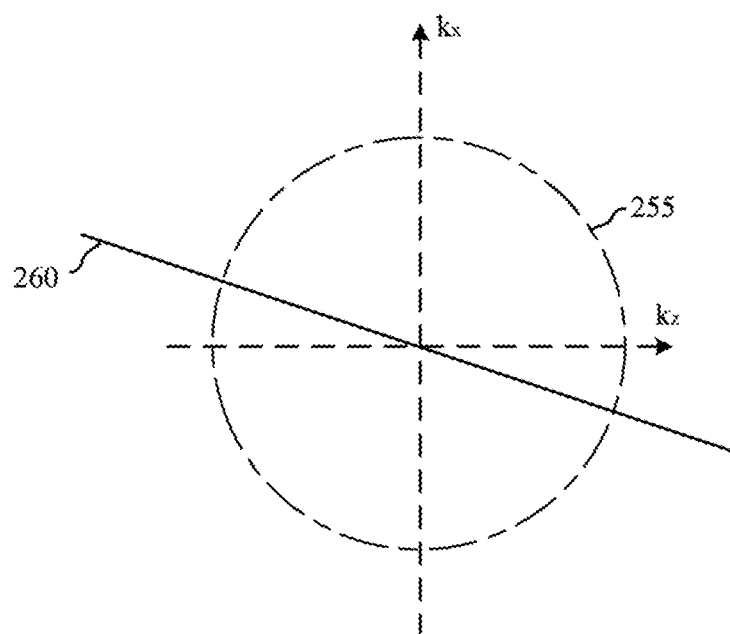
FIG. 2B is a diagram of an illustrative skew mirror in k-space in accordance with an embodiment.

FIG. 2B illustrates a k-space representation 200-b of the skew mirror 210 of FIG. 2A. The k-space distributions of spatially varying refractive index components are typically denoted $\Delta n(\vec{k})$. $\Delta n(\vec{k})$ k-space distribution 260 may pass through the origin, at an angle equal to reflective axis 225, measured with respect to the Z-axis. Recording k-sphere 255 may be the k-sphere corresponding to a particular writing wavelength. K-space representation 200-b may include various k-spheres corresponding to wavelengths of light residing in the red, green, and blue regions of the visible spectrum.

The k-space formalism may represent a method for analyzing holographic recording and diffraction. In k-space, propagating optical waves and holograms may be represented by three dimensional Fourier transforms of their distributions in real space. For example, an infinite collimated monochromatic reference beam may be represented in real space and k-space by equation (1):

$$E_r(\vec{r})A_r\exp(i\vec{k}_r \cdot \vec{r}) \xrightarrow{\mathfrak{I}} E_r(\vec{k}) = A_r\delta(\vec{k} - \vec{k}_r), \qquad (1)$$

where $E_r(\vec{r})$ is the optical scalar field distribution at all $\vec{r} = \{x, y, z\}$ 3D spatial vector locations, and the transform $E_r(\vec{k})$ of the distribution, is the optical scalar field distribution at all $\vec{k} = \{k_x, k_y, k_z\}$ 3D spatial frequency vectors. $A_r$ may represent the scalar complex amplitude of the field; and $\vec{k}_r$ may represent the wave vector, whose length indicates the spatial frequency of the light waves, and whose direction indicates the direction of propagation. In some implementations, all beams may be composed of light of the same wavelength, so all optical wave vectors may have the same length, i.e., $|\vec{k}_r| = k_n$. Thus, all optical propagation vectors may lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms may consist of spatial variations of the index of refraction within a grating medium. The index of refraction spatial variations, typically denoted $\Delta n(\vec{r})$, can be referred to as index modulation patterns, the k-space distributions of which may be denoted $\Delta n(\vec{k})$. The index modulation pattern may be created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \quad (2)$$

where $E_1(\vec{r})$ is the spatial distribution of the signal first recording beam field and $E_2(\vec{r})$ is the spatial distribution of the second recording beam field. The unary operator denotes complex conjugation. The final term in equation (2), $E_1(\vec{r})E_2^*(\vec{r})$, may map the incident second recording beam into the diffracted first recording beam. Thus the following equation may result:

$$E_1(\vec{r})E_2^*(\vec{r}) \xrightarrow{\mathfrak{I}} E_1(\vec{k}) \otimes E_2(\vec{k}), \qquad (3)$$

where ⊗ is the 3D cross correlation operator. This is to say, the product of one optical field and the complex conjugate of another in the spatial domain may become a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ may represent grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam may be angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k})\big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation "$|\vec{k}|=k_n$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

In some cases, when the probe beam resembles one of the recording beams used for recording, the effect of the convolution may be to reverse the cross correlation during recording, and the diffracted beam may substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

The term probe beam, used when describing skew mirror properties in k-space, is analogous to the term incident light, which is used when describing skew mirror reflective properties in real space. Similarly, the term diffracted beam, used when describing skew mirror properties in k-space, is analogous to the term principal reflected light, used when describing skew mirror properties in real space. Thus when describing reflective properties of a skew mirror in real space, it may be typical to state that incident light is reflected by a hologram (or other grating structure) as principal reflected light, though to state that a probe beam is diffracted by the hologram to produce a diffracted beam is synonymous. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3:
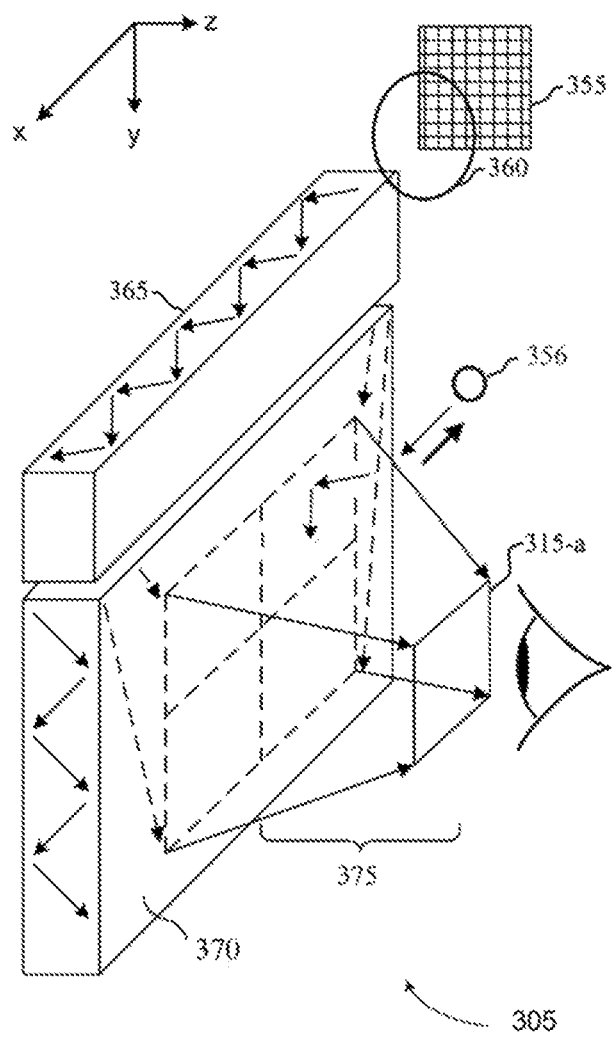
FIG. 3 is a diagram of an illustrative optical system incorporating volume holographic grating structure exit pupil expansion techniques in accordance with an embodiment.

FIG. 3 is a diagram of an optical system incorporating two-dimensional and one-dimensional skew mirror exit pupil expansion techniques in accordance with various aspects of the disclosure. Optical system 300 may be utilized in an HMD, augmented reality (AR), or virtual reality (VR) application such as, but not limited to, the HMD 100 of FIG. 1. Optical system 300 may also be utilized in various optical coupling applications such as, but not limited to, large screen display and optical sensor applications. The optical system 300 may employ selective coupling to allow skew mirror structures 305 (e.g., one or more skew mirrors implemented in zero, one, or more than one waveguide) to diffract light towards a specific location, such as an eye box 315-a, thereby improving photometric efficiency (e.g., image brightness). Selective coupling may have an advantageous effect of producing an external exit pupil at the eye box 315-a. An external exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration.

Optical system 300 may include a display 355 (e.g., a display that emits visible light), a light emitting component 356 (e.g., a component that emits non-visible light such as NIR or IR light), a collimator 360, a horizontal waveguide 365, a vertical waveguide 370, and an eye box 315-a. Eye box 315-a may be a distance from the vertical waveguide 370 hereby known as the eye relief 375. Skew mirror structures 305 may include one or more skew mirrors implemented in one or both of waveguides 365 and 370. Optical system 300 illustrates an example of a two-dimensional and one-dimensional pupil expander that may utilize skew mirrors. A skew mirror disposed in horizontal waveguide 365 may be referred to as a cross coupler. In some cases, a skew mirror disposed in the vertical waveguide 370 may be referred to as an output coupler.

In some cases, the exit auxiliary imaging techniques as herein may be used in conjunction with one-dimensional and/or two-dimensional pupil expansion by utilizing two or more skew mirrors. For example, a horizontal waveguide 365 may include a first skew mirror that is operatively coupled to a second skew mirror. The first skew mirror may be used to expand the pupil in a horizontal direction (parallel to the X-axis of FIG. 3). In some examples, the first skew mirror (e.g., a cross coupler) may be disposed within a separate 2D (duct-type) waveguide. The second skew mirror may be used to expand the pupil in a vertical direction (parallel to the Y-axis of FIG. 3). In some examples, the second skew mirror (e.g., an output coupler) may be disposed within a separate 1D (slab-type) waveguide. In some examples, the first skew mirror (e.g., a cross coupler) and the second skew mirror (e.g., an output coupler) may be disposed within a single 1D (slab-type) waveguide. In some examples, the first skew mirror and the second skew mirror may abut or be otherwise operatively coupled vertically (e.g., along the Y-axis). In some examples, the first skew mirror and the second skew mirror may abut or be otherwise operatively coupled horizontally (e.g., along the X-axis). In some examples, the first skew mirror and the second skew mirror may abut or be otherwise operatively coupled in an overlapping manner (e.g., along the Z-axis).

As shown in FIG. 3, horizontal waveguide 365 may propagate light emitted by display 355 (and collimated using collimator 360) in the horizontal direction. The skew mirror in horizontal waveguide 365 may couple this light downward into vertical waveguide 370 as the light traverses horizontal waveguide 365. In this way, the light emitted by display 355 may be expanded across two dimensions. The skew mirror in vertical waveguide 370 may couple the two-dimensionally expanded light into eye box 315-a. This may, for example, allow for display 355 to project a two-dimensional visible light image into eye box 315-a for viewing by a user. At the same time, light-emitting component 356 may emit non-visible light (e.g., IR and/or NIR light) into vertical waveguide 370. If desired, an additional collimator may be interposed between vertical waveguide 370 and light-emitting component 356. This light may traverse waveguide 370 in one dimension (e.g., along the vertical or horizontal dimension) without significant expansion in a second dimension. This one-dimensionally expanded light may be coupled into eye box 315-a by a skew mirror in waveguide 370. This may allow for component 356 to project light onto the user's eye. This light may, for example, be used to gather a gaze tracking image that tracks features of the user's eye (e.g., the user's retina, optic nerve, etc.) across a narrow field of view (e.g., a narrower field of view than the visible light coupled into eye box 315-a). For example, the non-visible light may be reflected off of the user's eye back towards waveguide 370. The skew mirror in waveguide 370 may reflect this non-visible light towards an imaging device. The imaging device may capture the non-visible light and may process the captured light to perform gaze tracking. Such an imaging device is shown schematically in FIG. 3 by component 356 (e.g., component 356 may include a light emitter and an imaging device if desired). The (reflected) non-visible light that is captured by the imaging device is shown by the arrow pointing towards component 356. The non-visible light emitted by component 356 is shown by the arrow pointing away from component 356. This example is merely illustrative and, if desired, a separate imaging device may be formed at any desired location around waveguide 370. If desired, this non-visible light may additionally or alternatively be used (processed) to gather user identification information based on the retina or other physiological characteristics of the user's eye (e.g., physiological characteristics that would be unique to a particular individual).

In this way, optical system 100 may perform two-dimensional expansion for visible light and one-dimensional expansion for non-visible light. For example, the field of view of the non-visible light coupled into eye box 315-a may be narrower in the vertical dimension (e.g., parallel to the Y-axis) than the field of view of visible light coupled into eye box 315 by the skew mirror (e.g., because the skew mirror expands the visible light in two dimensions whereas the skew mirror does not expand the non-visible light in two dimensions). The field of view for the visible light parallel to the X-axis may be the same size as, narrower than, or longer than the field of view for the non-visible light parallel to the X-axis. The total area of the field of view for the visible light may be greater than the total area of the field of view for the non-visible light, for example. Using only one-dimensional expansion for the non-visible light may, for example, eliminate the need for an additional cross coupler for the non-visible light and may optimize processing efficiency and space within the device (e.g., while still allowing desired eye features to be tracked to determine gaze direction). This example is merely illustrative. If desired, the locations of display 355 and component 356 in FIG. 3 may be swapped (e.g., two-dimensional expansion may be performed for non-visible light whereas one-dimensional expansion is performed for visible light). In another suitable arrangement, two-dimensional expansion may be performed for both visible and non-visible light. Any desired number and combination of 2D waveguides, 1D waveguides, skew mirror-based output couplers, and skew mirror-based cross couplers may be used for expanding the visible light emitted by display 355 and the non-visible light emitted by component 356 in one and/or two dimensions. In another suitable arrangement, two-dimensional expansion may be performed for visible light using a cross-coupler and one-dimensional expansion may be performed for non-visible light using an output coupler both formed in the same waveguide. For example, the skew mirror (volume holographic light coupling element) may include multiple volume holographic grating structures (e.g., volume holograms) such as both volume holographic grating structures that serve as cross-couplers and volume holographic grating structures that serve as output couplers. In another suitable arrangement, multiple skew mirrors (volume holographic light coupling elements) may be used where one skew mirror includes an output coupler for non-visible light and a cross-coupler for visible light.

Figure 4:
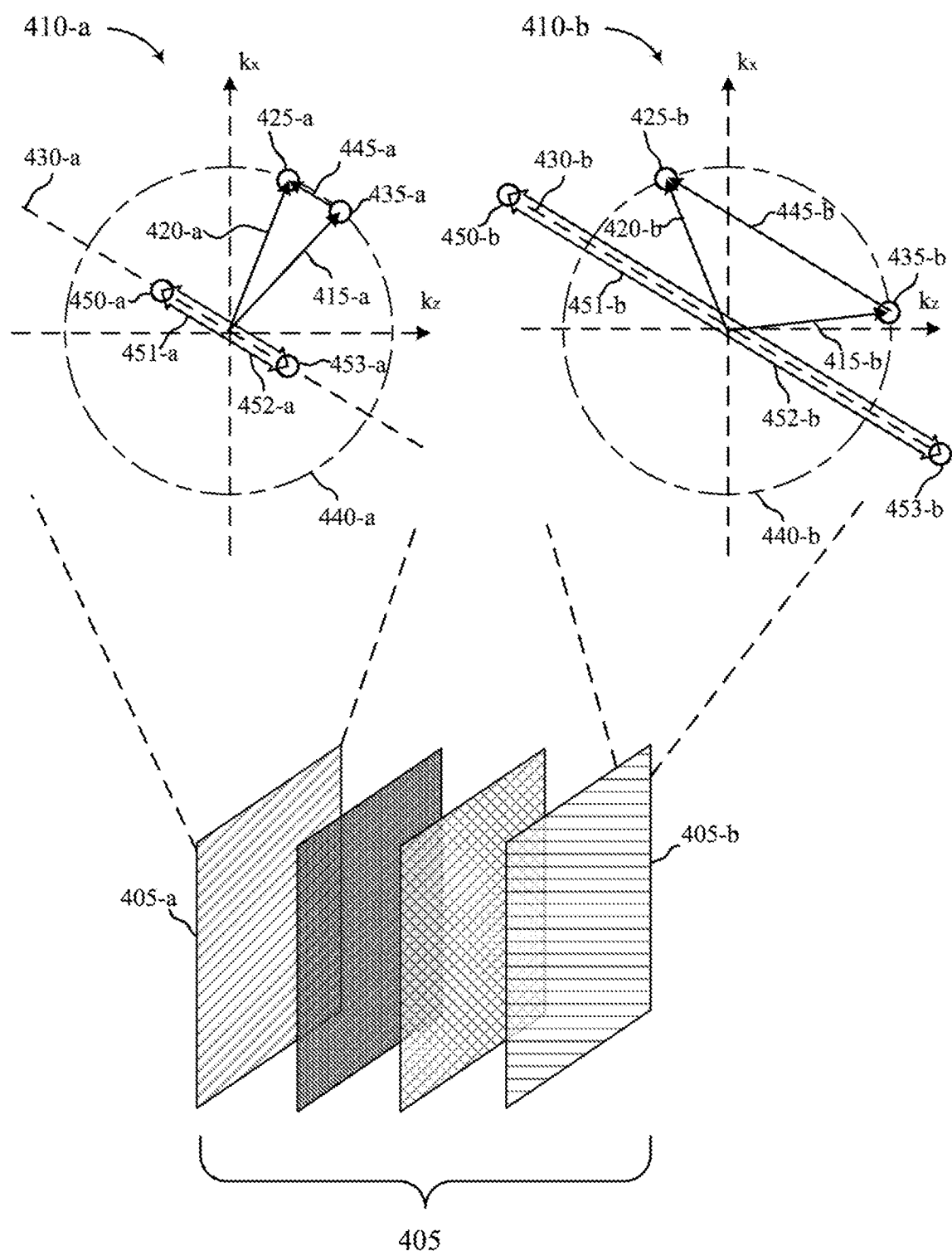
FIG. 4 is a diagram of an illustrative optical component having multiple volume holographic grating structures in accordance with an embodiment.

FIG. 4 is a diagram of an optical component 400 that includes a plurality of volume holographic grating structures 405. Optical component 400 may be a volume holographic light coupling element such as a coupler (e.g., an output coupler or cross coupler) formed from a skew mirror, for example. Grating structures 405 may be similar to the grating structures with a grating medium described herein. Grating structures 405 are illustrated in an exploded view manner for discussion purposes, but these grating structures 405 may overlap and intermingle within a volume or space of a grating medium as described herein. Also, each grating structure may have a different diffraction angle response and may reflect light at a wavelength that is different than another grating structure.

The example of FIG. 4. shows k-space diagrams for two of the grating structures in optical component 400. Grating structure 405-a may have a corresponding k-space diagram 410-a, and the grating structure 405-b may have a corresponding k-space diagram 410-b. The k-space diagrams 410-a and 410-b may illustrate cases of Bragg-matched reconstruction by illuminating a hologram.

The k-space diagram 410-a illustrates the reflection of an incident light by the grating structure 405-a. The k-space diagram 410-a is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-a may include positive sideband $\Delta n(\vec{k})$ k-space distribution 450-a that has an angle measured with respect to the Z-axis, equal to that of the reflective axis 430-a of the grating structure 405-a. The k-space diagram 410-a may also include a negative sideband $\Delta n(\vec{k})$ k-space distribution 453-a that has an angle measured with respect to the Z-axis, equal to that of the reflective axis 430-a. The k-sphere 440-a may represent visible blue light, visible green light, visible red light, non-visible IR light, or non-visible NIR light.

The k-space diagram 410-a depicts a case where probe beam 435-a produces a diffracted beam k-space distribution 425-a, $E_d(\vec{k})$, that is point-like and lies on the probe beam k-sphere 440-a. The diffracted beam k-space distribution 425-a is produced according to the convolution of Equation (4).

The probe beam may have a k-space distribution 435-a, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-a, $\vec{k}_p$ represents a probe beam wave vector 415-a, and $\vec{K}_{G+}$ represents a positive sideband grating vector 451-a. Vector 445-a represents the sum of the probe beam wave vector 415-a and the positive sideband grating vector 451-a according to the convolution of Equation (4). The k-space diagram 410-a also has a negative sideband grating vector 452-a.

The probe beam wave vector 415-a and the diffracted beam wave vector 420-a may form the legs of a substantially isosceles triangle. The equal angles of this triangle may be congruent with the angle of incidence and angle of reflection, both measured with respect to the reflective axis 430-a. Thus, the grating structure 405-a may reflect light in a substantially mirror-like manner about the reflective axis 430-a.

The k-space diagram 410-b may illustrate the reflection of an incident light by the grating structure 405-b. The grating structure 405-b may reflect incident light at a plurality of incidence angles that are different than the incidence angles reflected by the grating structure 405-a. The grating structure 405-b may also reflect light at a different wavelength than the grating structure 405-a. The k-space diagram 410-b may be a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-b has a positive sideband $\Delta n(\vec{k})$ k-space distribution 450-b that has an angle measured with respect to the Z-axis, equal to that of the reflective axis 430-b of grating structure 405-b. The k-space diagram 410-b also has a negative sideband $\Delta n(\vec{k})$ k-space distribution 453-b that has an angle measured with respect to the Z-axis, equal to that of the reflective axis 430-b. The k-sphere 440-b may represent visible blue light, visible green light, visible red light, non-visible IR, or non-visible NIR. In some embodiments, the k-sphere may represent other wavelengths of electromagnetic radiation, including but not limited to ultraviolet wavelengths.

The k-space diagram 410-b depicts a case where the probe beam 435-b produces a diffracted beam k-space distribution 425-b, $E_d(\vec{k})$, that is point-like and lies on the probe beam k-sphere 440-b. The diffracted beam k-space distribution 425-b is produced according to the convolution of Equation (4).

The probe beam 435-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-b, $\vec{k}_p$ represents a probe beam wave vector 415-b, and $\vec{K}_{G+}$ represents a positive sideband grating vector 451-b. Vector 445-b represents the sum of the probe beam wave vector 415-b and the positive sideband grating vector 451-b according to the convolution of Equation (4). The k-space diagram 410-b also has a negative sideband grating vector 452-b.

The probe beam wave vector 415-b and the diffracted beam wave vector 420-b may form the legs of a substantially isosceles triangle. The equal angles of this triangle may be congruent with the angle of incidence and angle of reflection, both measured with respect to the reflective axis 430-b. Thus, the grating structure 405-b may reflect light in a substantially mirror-like manner about the reflective axis 430-b.

Figure 5A:
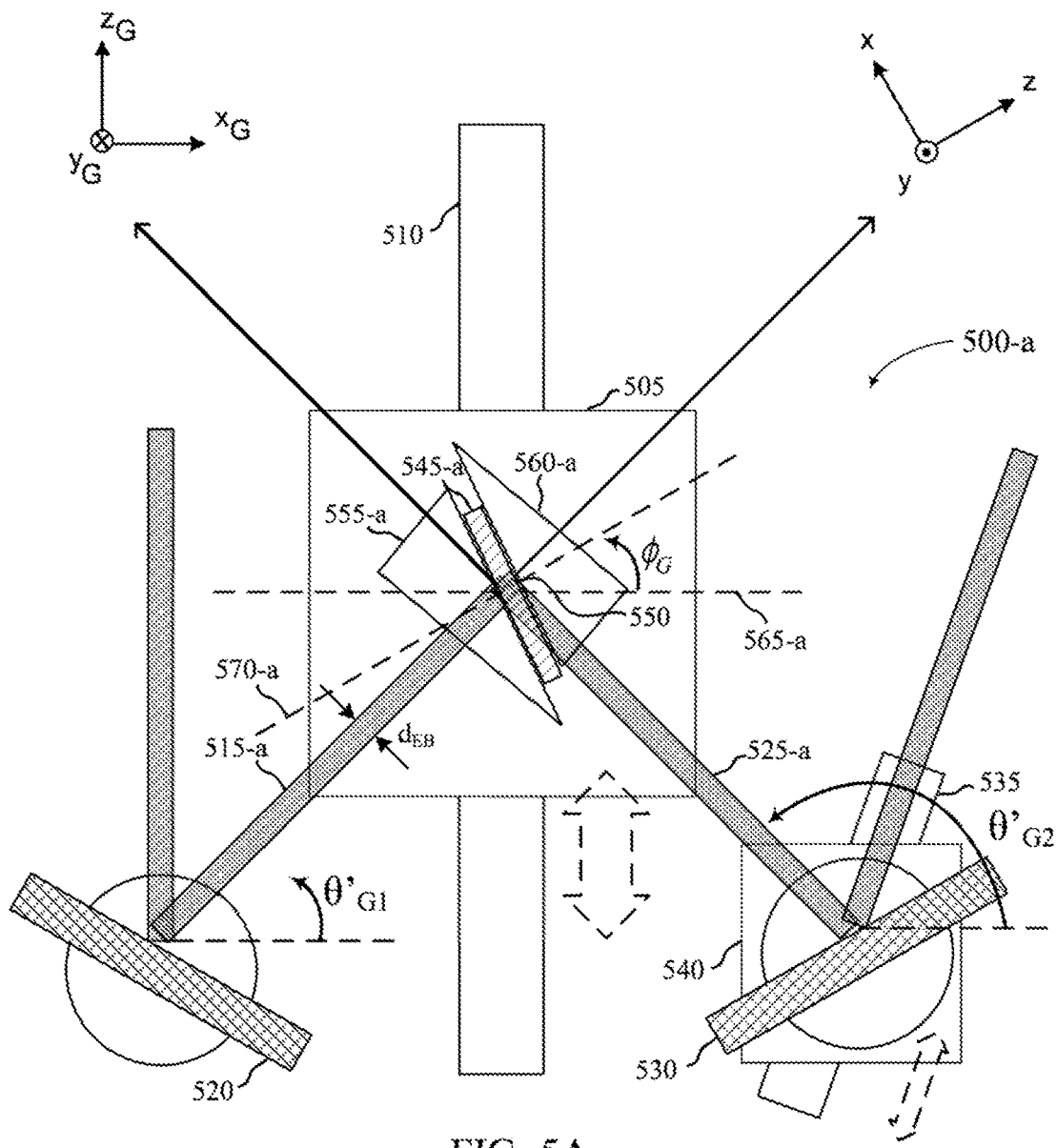
FIG. 5A is a diagram of an illustrative manufacturing system that can be used to manufacture a volume holographic grating structure such as a skew mirror in accordance with an embodiment.

FIG. 5A shows a manufacturing system 500-a for manufacturing a skew mirror in accordance with various aspects of the disclosure. System 500-a may include a sample stage carrier 505, a sample carrier rail 510, a first recording beam 515-a, a signal mirror 520, a second recording beam 525-a, a reference mirror 530, a reference mirror carrier rail 535, a reference mirror carrier 540, a grating medium 545-a, a hologram 550, a first prism 555-a, and a second prism 560-a.

System 500-a may include global coordinates $(x_G, y_G, z_G)$ and skew mirror coordinates (x, y, z). The origin may be defined to be in the center of the grating medium 545-a. In some cases, the grating medium 545-a may comprise a generally rectangular shape where 'z' corresponds to the thickness of the grating medium 545-a, 'x' corresponds to the length of the in-plane side of the grating medium 545-a, and 'y' corresponds to the length of the in-plane side of the grating medium 545-a. The global angle for recording, $\theta_G$, may be defined as the angle of the first recording beam 515-a with respect to the $x_G$-axis inside grating medium 545-a. Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & \sin\phi_G \end{bmatrix} \begin{bmatrix} x \\ y \\ z \end{bmatrix} \quad (8)$$

The system 500-a may be used to configure recording beams to have a size approximately equal to a desired eye box size. In an implementation, the system 500-a may dispose rotating mirrors such as the signal mirror 520 and the reference mirror 530 to create the correct angles for the first recording beam 515-a and the second recording beam 525-a. The angle of the signal mirror 520 may be changed to produce a desired angle ($\theta_{G1}$) of first recording beam 515-a with width ~$d_{EB}$. The sample stage carrier 505 and the reference mirror carrier 540 may be positioned so as to illuminate the correct location with the recording beams for each exposure. The sample stage carrier 505 of the system 500-a may be positioned on the sample carrier rail 510 to facilitate the illumination of the grating medium 545-a with the first recording beam 515-a in the desired location. The reference mirror carrier 540 may be positioned on the reference mirror carrier rail 535 to facilitate the illumination of the grating medium 545-a with the second recording beam 525-a in the desired location. The grating medium 545-*a* may be referred to as a recording medium prior to or during hologram recording, and may include a photopolymer. In some embodiments, the grating medium may comprise photorefractive crystals, dichromatic gelatin, photo-thermo-refractive glass, and/or film containing dispersed silver halide particles.

With the rotation of the signal mirror 520 and the reference mirror 530 set, the mirrors may be arranged to direct the first recording beam 515-*a* and the second recording beam 525-*a* such that the recording beams intersect and interfere with each other to form an interference pattern that is recorded as a hologram 550 in the grating medium 545-*a*. The hologram 550 may be an example of a grating structure. The system 500-*a* may form multiple grating structures, each configured to reflect light of a particular wavelength about the skew axis 565-*a* at a plurality of incidence angles. Each grating structure may be formed using a plurality of exposures of the grating medium 545-*a* to coherent light having a particular wavelength. The plurality of incidence angles corresponding to each grating structure may be offset from one another by a minimum range of angles.

In some implementations, the recording beams may have widths that differ from each other, or they may be the same. The recording beams may each have the same intensity as each other, or intensity can differ among the beams. The intensity of the beams may be non-uniform. The grating medium 545-*a* is typically secured in place between the first prism 555-*a* and the second prism 560-*a* using a fluid index matched to both the prisms and the grating medium. A skew axis 565-*a* resides at a skew angle relative to the surface normal 570-*a*. As depicted in FIG. 5A, skew angle may be −30.25 degrees relative to the surface normal 570-*a*. The angle between the first and second recording beams may reside in a range from 0 to 180 degrees. The recorded skew angle relative to surface normal 570-*a* then becomes $\phi' = (\theta_{R1}+\theta_{R2}-180°)/2+\phi_G$ for in-plane system 500-*a*. For the nominal case where $\theta_{G2}=180'-\theta_{G1}$, $\phi'=\phi_G$. In FIG. 5, $\phi_G$ shows the nominal skew angle relative to surface normal. Additionally, in FIG. 5, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 515-*a* and the second recording beam 525-*a* beam, respectively, within the first prism 555-*a* and the second prism 560-*a*. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 515-*a* and the second recording beam 525-*a* may be nominally symmetrical about the skew axis 565-*a* such that the sum of first recording beam internal angle relative to the skew axis and the second recording beam internal angle relative to the skew axis equates to 180 degrees. Each of the first and second recording beams may be collimated plane wave beams originating from a laser light source.

Refraction at air/prism boundaries, for example where the first recording beam 515-*a* intersects an air/prism boundary of the first prism 555-*a* and where the second recording beam 525-*a* intersects an air/prism boundary of the second prism 560-*a*, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 500-*a*, a variable wavelength laser may be used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet wavelength, IR wavelength and/or NIR wavelength. Each grating structure of the system 500-*a* may reflect an incidence angle at a wavelength that is different than another grating structure. The system 500-*a* may have reflective properties that allow it to reflect light at a substantially different wavelength, and in particular a considerably longer wavelength, than the recording beam wavelength.

Figure 5B:
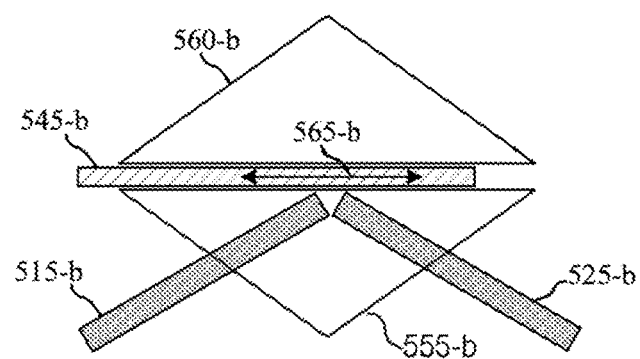
FIG. 5B is a diagram of an illustrative manufacturing system that can be used to manufacture a volume holographic grating structure such as a skew mirror in accordance with an embodiment.

FIG. 5B shows a manufacturing system 500-*b* for manufacturing a skew mirror in accordance with various aspects of the disclosure. System 500-*b* may include a first recording beam 515-*b*, a second recording beam 525-*b*, a grating medium 545-*b*, a first prism 555-*b*, a second prism 560-*b*, and skew axis 565-*b*. System 500-*b* may be an expanded view in reference to embodiments discussed in reference to FIG. 5A.

In some cases, one or more skew mirrors may be fabricated for a light coupling device used as a cross coupler. For example, each reflective axis may be either parallel or angularly offset to the surfaces of the one or more waveguides within the pupil expander. For example, a cross coupler having a crossed skew mirror cross coupler configuration may be fabricated by re-orienting the grating medium 545-*b* within the first prism 555-*b* and the second prism 560-*b*. In some recording implementations, the second prism 560-*b* may be omitted and replaced with a component for securing or stabilizing the grating medium 545-*b*. The component for securing or stabilizing the grating medium 545-*b* that may also include light absorbing characteristics. For example, the first recording beam 515-*b* and the second recording beam 525-*b* may both enter the first prism 555-*b* when configuring a cross coupler.

In some cases, a second skew mirror orientation may be recorded on the re-oriented grating medium 545-*b*. The second skew mirror may be oriented in an at least partially overlapping, or non-overlapping manner with the first skew mirror. Thus, a cross skewed mirror configuration is formed in a given volume of the grating medium 545-*b* (i.e., the recording medium after reorienting and curing processes). The re-orienting process may be repeated to record all desired skew axes of the light coupling device. In some cases, the second skew mirror may be oriented in a non-overlapping manner with the first skew mirror.

Figure 6:
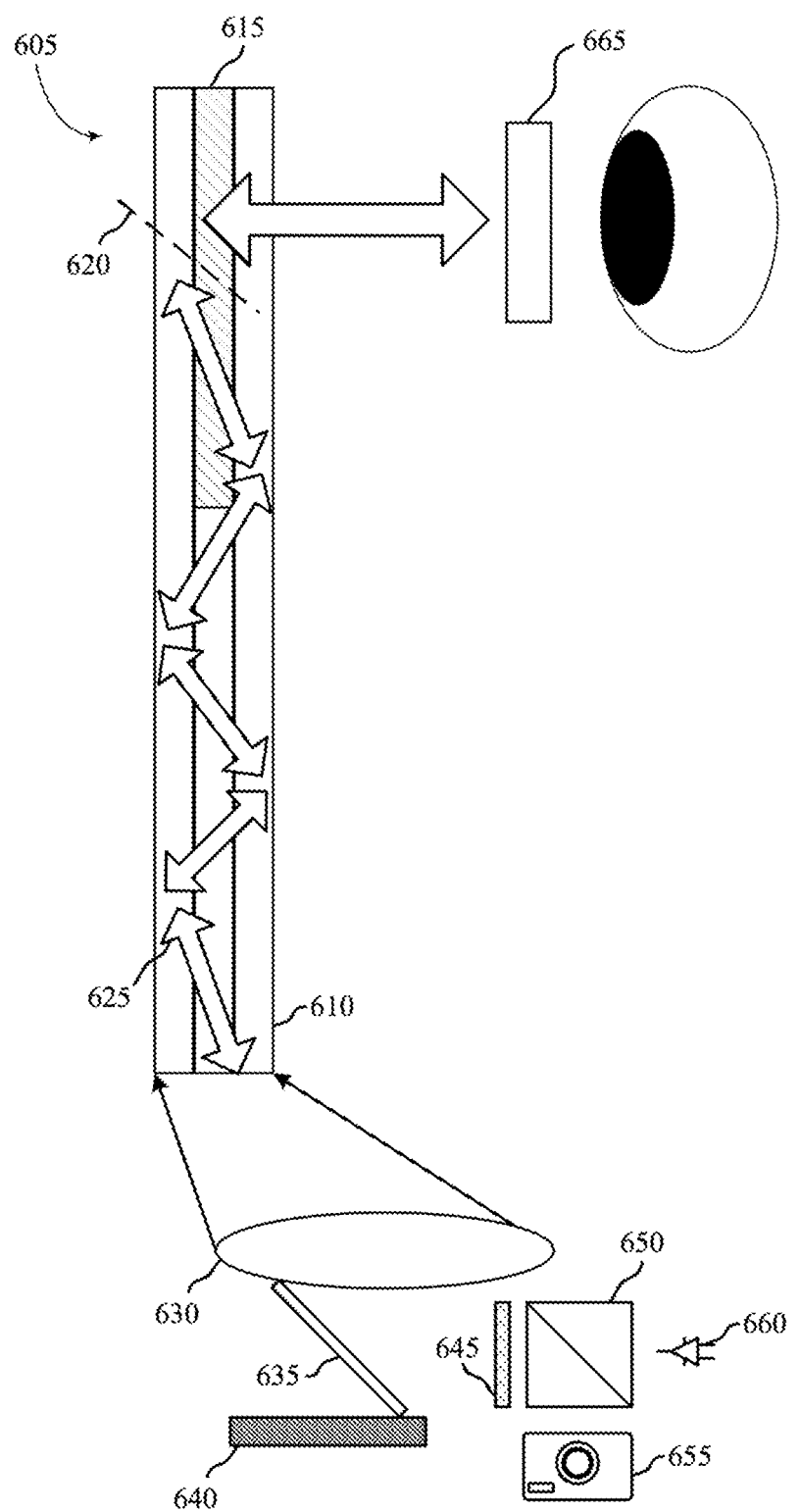
FIG. 6 is a diagram of an illustrative optical system incorporating an auxiliary imaging function in accordance with an embodiment.

FIG. 6 illustrates a diagram of an optical system 600 incorporating skew mirror auxiliary imaging. Optical system 600 may be utilized in a NED, AR, or VR application such as, but not limited to, the HMD 100 of FIG. 1. Optical system 600 may also be utilized in various optical or electromagnetic wave coupling applications such as, but not limited to, large screen display, optical sensor, and millimeter waveguide applications. Optical system 600 may employ selective coupling at a grating medium 615 to diffract light towards a specific location, such as an eye box 665, thereby improving photometric efficiency (e.g., image brightness). The optical system 600 may also employ selective coupling at the grating medium 615 to light of an external FOV, including reflected non-visible light frequencies indicative of eye gaze tracking. Optical system 600 is viewed from an overhead perspective and could represent either the left or right eye of the user.

In some cases, skew mirror 605 and grating medium 615 may be both be located at least partially within a waveguide of the optical system 600. The waveguide shown in FIG. 6 includes one or more substrates 610 with a skew mirror 605 and grating medium 615 located along a portion of the waveguide (e.g., at one end of the waveguide as shown in FIG. 6 or at any other desired location along the waveguide). The waveguide propagates light 625 over its length via total internal reflection (e.g., from the end of the waveguide adjacent to collimator (lens) 630 to the portion of the waveguide in which skew mirror 605 is located and vice versa). Skew mirror 605 of FIG. 6 may, for example, be used to form an output coupler and/or a cross-coupler in a waveguide such as the waveguide of FIG. 6, waveguides 370 and/or 365 of FIG. 3, etc. Grating medium 615 may be disposed within skew mirror 605 and contain one or more volume holographic grating structures (volume holograms) used in forming skew mirror 605 (sometimes referred to herein as volume holographic light coupling element 605). Grating medium 615 may be at least partially or wholly enclosed by one or more substrates (e.g., glass covers or like protective layers) 610 of the waveguide. A grating structure may be optical device that may reflect, diffract, and/or split incident light into beams or waves that may then continue propagating in different directions. A grating may be characterized by a diffracted angle response of the grating. The diffracted angle response may express the change in the angle of reflection of the light in response to small changes in the angle of incidence.

Grating medium 615 may include a photopolymer, photorefractive crystals, dichromated gelatin, photo-thermo-refractive glass, film containing dispersed silver halide particles, or other material with the ability to react to and record an incident interference pattern. The volume holographic grating structures may include holograms such as volume-phase holograms. Multiple holograms may be recorded into the grating medium internal volume and may thus extend below the grating medium surface. Accordingly, these holograms are sometimes referred to as volume holograms. In some implementations, each of the multiple holograms at least partially spatially overlaps at least one, but not all, of the other of the multiple holograms. In some examples, each of the multiple holograms at least partially spatially overlaps all of the other holograms. In some embodiments, some of the multiple holograms may not spatially overlap some of the other holograms.

For example, spatially overlapping holograms overlap with respect to the space occupied or volume shared by two holograms in a contiguous grating medium (e.g., two spatially overlapping holograms share or coexist in at least a portion of the same space or volume within the grating medium 615). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium 615. In examples where holograms do not spatially overlap, the two holograms do not intersect or overlap in any manner within a contiguous grating medium. For example, a first hologram may be disposed on a volumetric portion of the grating medium 615 spaced apart from a second hologram. In some embodiments, a skew mirror may include both spatially overlapping and spatially non-overlapping holograms within the grating medium 615.

Each volume holographic grating structure within the grating medium 615 may be configured to reflect light about a reflective axis of the skew mirror 605. The reflective axis may be an example of the axis 620, as illustrated. The reflective axis may be offset from a surface normal of the grating medium. Incident light and its reflection are bisected by the reflective axis such that the internal angle of incidence of the incident light relative to the reflective axis has the same magnitude as the internal angle of reflection of the reflected light relative to the reflective axis. That is, the incident light and its reflection may exhibit bilateral symmetry about the reflective axis. In some implementations, a grating structure may be configured to reflect light at a reflection angle between the plurality of incidence angles and the surface normal of the grating medium.

A non-visible light source 660 (e.g., an NIR or IR diode) may be included in optical system 600 and may emit non-visible input light for subsequent propagation through the waveguide. The emitted non-visible light may correspond to one or more wave frequency spectrums distinct from the visible light spectrum (e.g., NIR light). The spatial wave frequencies of non-visible light may correspond to frequencies at least partially undetectable by a human retina. A light source or light projector 640 (e.g., an image display including an array of pixels, micro display, projector, etc.) may also be included in optical system 600 and may emit visible light including wavelengths of visible red, green, and blue light. The emitted visible light may correspond to an image projection of the optical system 600 for subsequent display at the eye box 665. If desired, display 640 may be omitted in some configurations.

The non-visible light of light source 660 may be directed to a filter 635 (e.g., an optical filter such as a dichroic filter) and reflected, via filter 635, for input to the waveguide containing skew mirror 605. The visible light of light source or light projector 640 may be passed through filter 635 for input to the waveguide containing skew mirror 605. In one suitable arrangement, filter 635 may be a skew mirror (e.g., may include one or more volume holographic grating structures in a grating medium for directing non-visible light from light source 660 and visible light from display 640 into the waveguide containing skew mirror 605). The transmittance of visible light in conjunction with the directed reflectivity of NIR light may allow filter 635 to combine the light modes provided by light sources 640 and 660 to form an entrance pupil for the waveguide and propagation toward an output coupler portion of grating medium 615, as well as to separate returning light propagating from skew mirror 605. In some cases, filter 635 may direct the input light to the waveguide of the optical system 600. The skew mirror 605 itself may generally be a waveguide embodiment (e.g., a TIR waveguide). One or more skew mirror type components or devices (e.g., a cross coupler embodiment) may guide input light at the waveguide and reflect the input light for propagation through the waveguide in a different direction. Alternatively, filter 635 may direct the input light to skew mirror 605 without waveguiding the propagation paths of the IR or NIR and visible light modes of the input light.

Incident light may propagate by TIR toward one or more grating structures of the grating medium 615. In some cases, grating medium 615 may include volume holographic structures that are Bragg matched for combinations of angles and wavelengths that differ from each other. That is, within the grating medium, wavelengths of light that differ from each other are reflected along a same reflective axis based on volume holographic grating structures that may differ from each other. The non-visible light and visible light may be selectively reflected by one or more structures of the grating medium 615, and directed to eye box 665 for external display or illumination.

Optical system 600 is illustrated as reflecting light at a plane residing approximately at an end of the grating medium 615. However, in practice, the light is typically reflected throughout the grating structure rather than at a specific plane. Additionally, for each reflected light ray intended to be directed to the eye box 665, one or more volume holograms in one or more volume holographic grating structures of the grating medium 615 may be written for various wavelengths of visible and non-visible light.

The visible light from display 640 may be directed to a user and may illuminate an eye of the user. The visible light may, for example, be expanded in two dimensions (e.g., as shown in FIG. 3). In this way, display 640 may project a visible image that is viewed and perceived by the user. The non-visible light from light source 660 may be directed to towards and may illuminate the eye of the user. Due to the spatial frequency of the light modes comprising the non-visible light, the non-visible light may illuminate the eye of the user without detection or recognition of the light modes. One or more light modes of the illuminated non-visible light may be reflected by the eye of the user, and in-coupled at grating medium 615 of skew mirror 605. The reflected non-visible light may correspond to a captured image of the user's eye (e.g., the user's retina, optical nerve, or other physiological features (e.g., as expanded in one dimension as shown in FIG. 3) and may be used to determine a viewing perspective of the user (e.g., to track the direction of the user's gaze using a gaze tracking operation). The view perspective of the user may then, if desired, be associated with an object within a corresponding FOV in the image-bearing light.

One or more volume holographic grating structures in grating medium 615 may selectively reflect the in-coupled non-visible reflection (e.g., the same volume holographic grating structure that coupled the non-visible light into the user's eye or a different volume holographic grating structure). The reflected non-visible light may propagate by total internal reflection through the waveguide enclosing skew mirror 605 and toward filter 635. In some cases, grating medium 615 and skew mirror 605 may be enclosed within a waveguide of optical system 600, and may direct the reflected non-visible light to filter 635 via the waveguide. The grating medium 615 may direct the input light through the waveguide to filter 650 without waveguiding the propagation paths of coupled light modes of the reflected non-visible light.

Filter 635 may selectively reflect the light modes of the reflected non-visible light, and direct the reflected non-visible light to an imaging device 655 (e.g., an eye gazing imaging device or camera configured to receive non-visible light). Imaging device 655 may be coupled to an optical path of optical system 600 and may determine gaze characteristics of the user associated with the FOV of the optical system 600 (e.g., to perform gaze tracking operations that track the direction of the user's gaze over time). If desired, imaging device 655 may also or alternatively determine an identity of the user based on physiological information (e.g., information about the user's retina) obtained from the reflected non-visible light. If desired, a birefringent material such as a QWP 645 or PBS 650 may be included in one or more optical paths included within optical system 600 and may receive the reflective non-visible light preemptive to a detector of imaging device 655. QWP 645 may segment the reflected non-visible light and adjust a plane of the light propagation, including adjusting the phase offset of one or more light modes associated with a refractive index. In some cases, QWP 645 may convert the polarization state (e.g., linearly polarized to circularly polarized or vice versa) of the reflected non-visible light. PBS 650 may direct the reflected non-visible light to imaging device 655 and may aid in separating the reflected non-visible light and alternative non-visible light emitted by light source 660. Imaging device 655 may receive and collect the external image of the reflected non-visible light and may perform gaze tracking. Imaging device 655 may determine a directional offset of the optical gaze of the user with respect to the FOV of a projected image. The directional offset may include a lateral and longitudinal offset within a reference orientation plane of the FOV of the projected image, as well as an angular and distal offset from the reference orientation plane, if desired.

The example of FIG. 6 in which display 640, imaging device 655, and component 660 are all operatively coupled to the bottom side of skew mirror 605 is merely illustrative. If desired, one or more of these components may be located along any other edges of skew mirror 605. Display 640 and component 660 need not be located at the same side of skew mirror 605. For example, display 640 may emit visible light into a first side of skew mirror 605 whereas component 660 emits non-visible light into a second side (e.g., a side opposing the first side or any other desired side) of skew mirror 605. Imaging device 655 may receive the reflected non-visible light from any side of skew mirror 605 (e.g., the same side through which component 660 emits non-visible light or a different side). In scenarios where these components are located on different sides of skew mirror 605, components 635, 645, and/or 650 may be omitted if desired. Any other desired optical components (e.g., lenses, filters, polarizers, etc.) may be used to couple visible light emitted by display 640 and non-visible light emitted by component 660 into skew mirror 605, and to direct reflected non-visible light from skew mirror 605 to imaging device 655.

Figure 7:
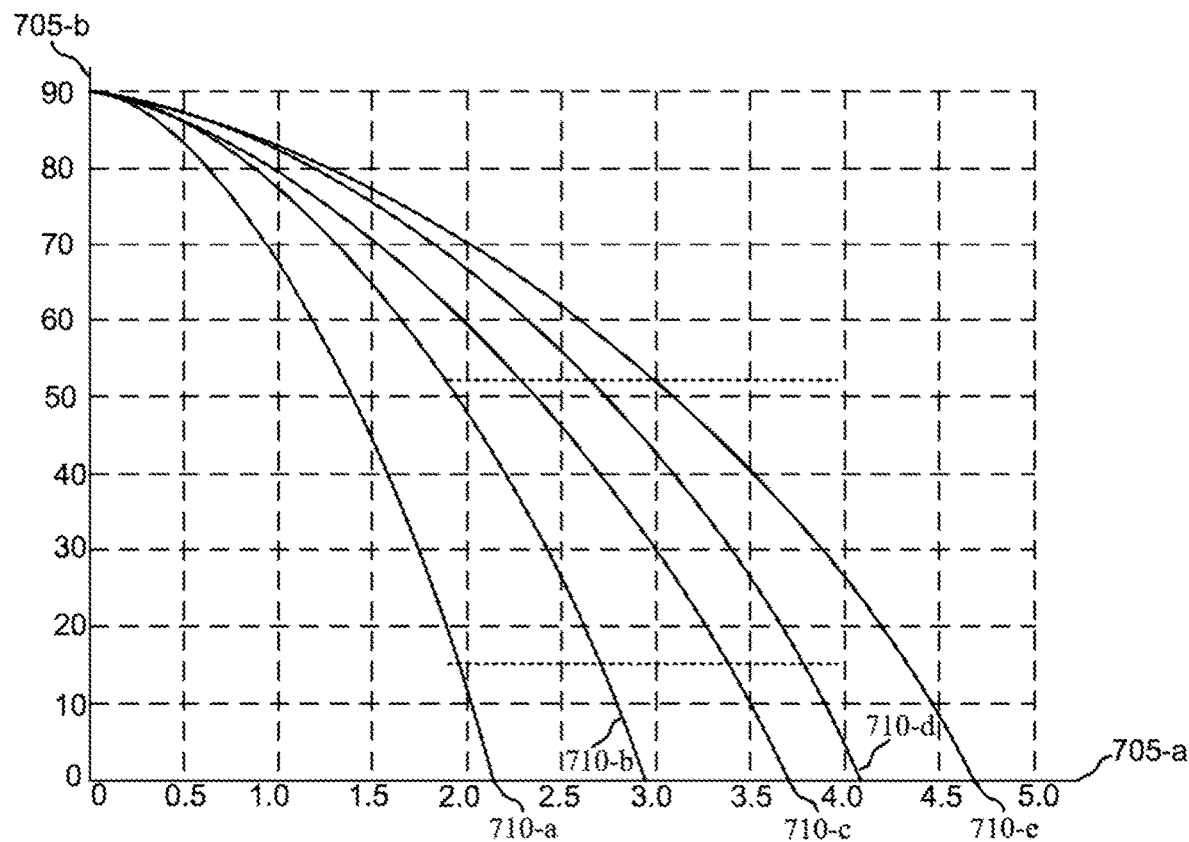
FIG. 7 is an illustrative plot that supports auxiliary imaging in accordance with an embodiment.

FIG. 7 illustrates a plot that supports aspects of auxiliary imaging in accordance with aspects of the present disclosure. Plot 700 includes a grating magnitude, as represented on axis 705-a and an angular measure of an internal angle with respect to a skew axis of the embodied optical system, as represented on axis 705-b. The optical system may be in reference to optical system 600 with reference to FIG. 6. The represented grating magnitudes of axis 705-a may be expressed in $10^7$ radians per meter (rad/m). The represented internal angles of axis 705-b may be expressed in degrees.

Plot line 710-e of plot 700 represents a recording beam at a wavelength of 405.0 nm. The illustrated plot line 710-e illustrates a mapping of an internal angle corresponding to a variant grating magnitude associated with the recording beam. Similarly, plot lines 710-d and 710-c represent beams of wavelengths 468.0 nm and 518.0 nm. Plot 700 includes representation of one or more NIR wavelength spectrum beams employed within the grating medium, as a means to perform coupling of emitted and reflected NIR light modes. Plot lines 710-b and 710-a represent beams at 638.0 and 860.0 nm wavelengths of the NIR spectrum.

As represented within the plot 700, and as illustrated by the dotted horizontal lines of the depicted FOV, one or more lower spatial frequencies of the projection (e.g., plot lines 710-a) may correspond to one or more higher spatial frequencies implemented for NIR gaze tracking. As a result, a FOV subset of the inset display FOV may be available for gaze tracking without necessitating additional holographic media or writing additional holograms for necessary for performing eye gazing functions or, if desired, specialized holograms for IR may be recorded in the same media layer or in a separate layer.

Figure 8:
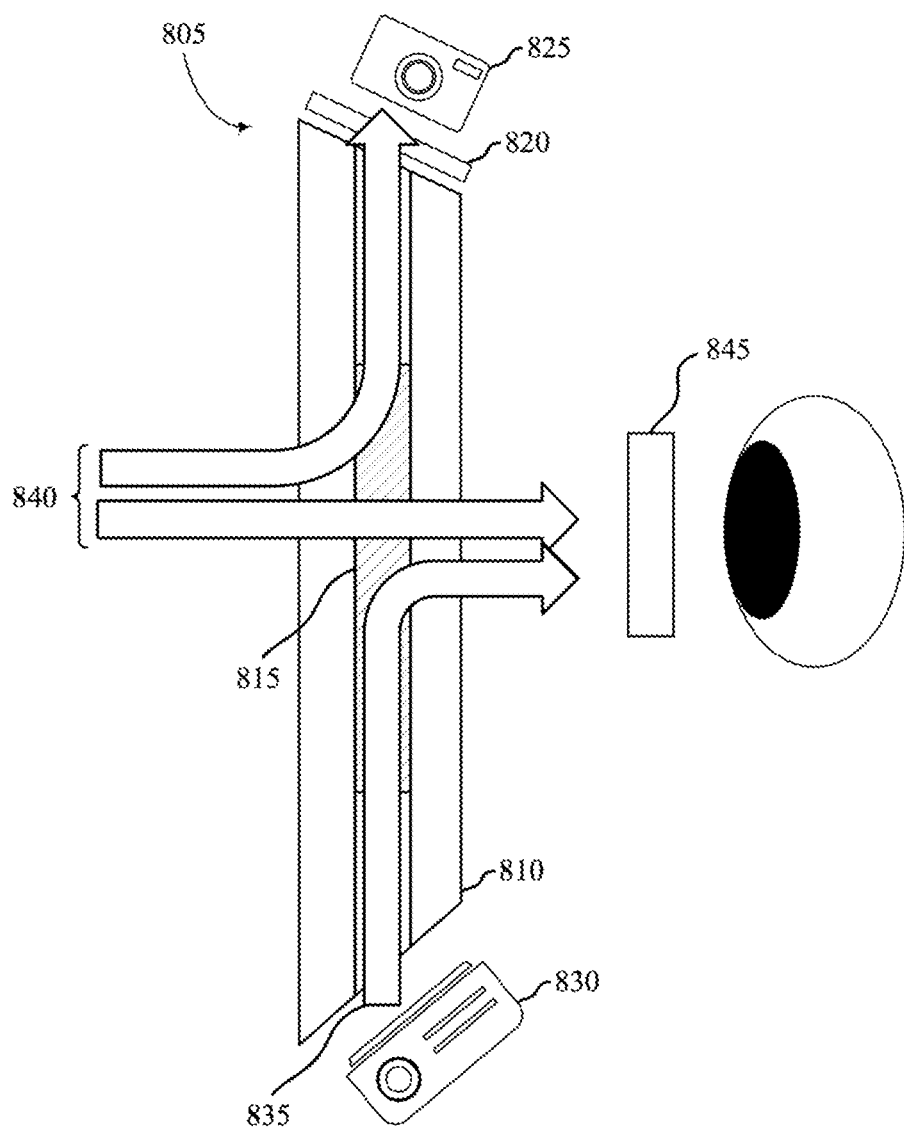
FIG. 8 is a diagram of an illustrative optical system incorporating an auxiliary imaging function in accordance with an embodiment.

FIG. 8 illustrates a diagram of an optical system 800 incorporating skew mirror auxiliary imaging. Optical system 800 may be utilized in a NED, AR, or VR application such as, but not limited to, the HMD 100 of FIG. 1. Optical system 800 may also be utilized in various optical or electromagnetic wave coupling applications such as, but not limited to, large screen display, optical sensor, and millimeter waveguide applications. Optical system 800 may employ selective coupling at a grating medium 815 to diffract light of a waveguide towards a specific location, such as an eye box 845, thereby improving photometric efficiency (e.g., image brightness). The optical system 800 may also employ selective coupling at the grating medium 815 to in-couple visible light corresponding to an external scene.

Grating medium 815 may be disposed within skew mirror 805 and contain one or more volume holographic grating structures. Skew mirror 805 and grating medium 815 may be located at least partially within a waveguide of the optical system 800. Grating medium 815 may be at least partially or wholly enclosed by one or more substrates (e.g., glass covers or like protective layers) 810 of the waveguide. Grating medium 815 may reflect, diffract, and/or split incident light into beams or waves that may then continue propagating in different directions. One or more gratings of medium 815 may be characterized by a diffracted angle response of the grating. The diffracted angle response may express the change in the angle of reflection of the light in response to small changes in the angle of incidence.

Grating medium 815 may include a photopolymer, photorefractive crystals, dichromated gelatin, photo-thermo-refractive glass, film containing dispersed silver halide particles, or other material with the ability to react to and record an incident interference pattern. The volume holographic grating structures may include volume holograms such as volume-phase holograms. Multiple volume holograms may be recorded into the grating medium internal volume and may thus extend below the grating medium surface. In some implementations, each of the multiple volume holograms at least partially spatially overlaps at least one, but not all, of the other of the multiple volume holograms. In some examples, each of the multiple volume holograms at least partially spatially overlaps all of the other volume holograms. In some embodiments, some of the multiple volume holograms may not spatially overlap some of the other volume holograms.

Each of the grating structures within grating medium 815 may be configured to reflect light, of a particular wavelength, about a reflective axis offset from surface normal of the grating medium 815, at a particular plurality of incident angles. The reflective axis may be the similar to the reflective the axis 620, as illustrated in the example of FIG. 6. The reflective axis may be offset from surface normal of grating medium 815. Incident light and its reflection may be bisected by the reflective axis such that the internal angle of incidence of the incident light relative to the reflective axis has the same magnitude as the internal angle of reflection of the reflected light relative to the reflective axis. That is, the incident light and its reflection may exhibit bilateral symmetry about the reflective axis. In some implementations, a volume holographic grating structure may be configured to reflect light at a reflection angle between the plurality of incidence angles and the surface normal of the grating medium.

Light source or light projector 830 (e.g., a display such as display 640 of FIG. 6) may be included in optical system 800 and may emit image display light 835 (e.g., visible light) of an image projection. Image display light 835 may correspond to input light from light source or light projector 830 that is formed into an entrance pupil, and may be in-coupled via an entrance aperture of a waveguide application. The waveguide may direct the one or more light modes contained within the entrance pupil, and the modes may propagate by TIR toward to skew mirror 805 and the enclosed grating medium 815. In some cases, one or more skew mirror type components or devices (e.g., a cross coupler embodiment) may guide the image display light 835 at the waveguide and reflect the light for propagation through the waveguide in a different direction. Grating medium 815 may selectively reflect, via one more structures of the grating medium 815, an exit pupil of the image display light 835. Grating medium 815 may direct the out-coupled light modes comprising image display light 835 to eye box 845 for external display. In some cases, exit pupil expansion and equalization techniques may be employed throughout the optical device 800, including skew mirror 805 (e.g., to expand the visible light in two dimensions as shown in FIG. 3). Skew mirror 805 may be operatively coupled with one or more embodiments of optical system 800, to expand the projected FOV of image display light 835.

Grating medium 815 may in-couple external scene light 840 surrounding the optical system 800. The external scene light 840 may generally be visible light, but also may include non-visible light, for example, in AR applications that use IR spectra to be received by a user. The external scene light 840 may form an additional entrance pupil of the optical system 800 that may correspond to an external scene or point of view of the user. In some cases, grating medium 815 may include volume holographic structures that are Bragg matched for combinations of angles and wavelengths corresponding light modes of external scene light 840. External scene light 840 may be selectively reflected, along a same reflective axis, by one or more grating structures of the grating medium 815, and directed to imaging device 825 (e.g., an external scene imaging device or camera configured to receive visible light) for image recording.

In some cases, stray image display light of the image display light 835 (i.e., a portion of the light that is not output coupled or reflected toward the eye box 845) may propagate through the waveguide to imaging device 825. The external scene light 840 may be superimposed with the stray image display light incident on a detector of imaging device 825. Based at least in part on the transmissivity of the waveguide, the external scene light 840 may be dim in comparison to the stray image display light. As a result, a filter 820 may be employed at the imaging device 825 as a means to remove the stray image display light or rebalance the stray image display light as compared to the external scene light 840. For example, filter 820 may employ a skew mirror embodiment configured reflect the same wavelengths of light as skew mirror 805. Filter 820 may include a polarizer or dichroic elements to block the stray image display light from the external scene light 840.

Additionally or alternatively, imaging device 825 may receive image information from light source or light projector 830 corresponding to the image display light 835 at a particular time. This image information may be used by imaging device 825 to remove the any remaining stray image display light that is propagated to the detector of the imaging device 825 along with the external scene light 840. In this manner, the external scene light 840 may be accurately determined by the imaging device 825 by digitally subtracting the stray image display light associated with a projected image of the light source or light projector 830. In some examples, optical system 800 may temporally segment or multiplex operations such that the light source or light projector 830 is not emitting the image display light 835 at a time when the imaging device 825 attempts to detect and record the external scene light 840. One or more of these mechanisms may be employed by optical system 800 to enhance the optical clarity of an external scene from the user's point of view to be detected and/or recorded by the imaging device 825. A non-visible light emitting component such as component 660 of FIG. 6 may also be combined with the arrangement of FIG. 8 to perform gaze tracking operations. In these scenarios, imaging device 655 of FIG. 6 may be used to receive non-visible light reflected off of the user's eye. Imaging device 655 and component 660 may be located at the same side of skew mirror 805 as imaging device 825, the same side as display 830, or on another side of skew mirror 805. Imaging device 655 and component 660 need not be formed on the same side of skew mirror 805. Imaging device 825 may be used to receive the reflected non-visible light for performing gaze tracking if desired. In another suitable arrangement, imaging device 825 may be used to capture external scene light 840, non-visible components 660 and 655 of FIG. 6 may be used to perform gaze tracking, and display 840 may be omitted (e.g., any desired combination of visible light display, external scene imaging, external scene light transmission onto the user's eye, and gaze tracking using non-visible light may be performed). The volume holographic grating structures in skew mirror 805 may direct the external scene light, the projected visible image, and the non-visible light for gaze tracking to the corresponding components in system 800.

The gaze tracking operations described above in connection with FIGS. 1-8 may be performed by capturing and analyzing images of the user's eye. The images may be captured using an imaging device in element 356 of FIG. 3, imaging device 655 of FIG. 6, etc. The captured images may be analyzed using control circuitry in HMD device 100, optical system 300, optical system 600, etc. The control circuitry may be configured to control the components of HMD device 100, optical system 300, optical system 600, etc. The control circuitry may be configured to perform these operations using hardware and/or software (e.g., code that runs on the hardware). Code for performing these operations may be stored on non-transitory computer readable storage media (e.g., non-volatile memory, one or more hard drives, one or more flash drives or other removable media, etc.). Code stored on the storage media may be executed using the processing circuitry of the control circuitry (e.g., one or more microprocessors, etc.).

The control circuitry may analyze the images for performing gaze tracking operations based on physiological features such as the iris, the cornea, the Purkinje reflections, and other features of the user's eye. If desired, the control circuitry may use images of these physiological features to perform user identity verification. Retinal gaze tracking may include processing images of the user's retina captured by the imaging device. The control circuitry may process elements such as the size of the retina, translation of the retina as the eye rotates, focus when the eye is accommodated at infinity, artifacts from waveguiding, veins or other features, or any other desired elements in performing the retinal gaze tracking. The control circuitry may use subsequent frame correlation techniques to track relative motion, may estimate blur kernel for accommodation, may perform absolute tracking (e.g., comparing images to a retina map, perform a reckoning filter, calibration routine, etc.), and/or may perform other processing steps in performing the retinal gaze tracking. Retinal gaze tacking may be facilitated by the fact that the retina, when viewed from outside the eye, is in afocal image space when the eye is accommodated at infinity. This means that ray bundles corresponding to image points on the retina are collimated outside the eye and may be coupled through a waveguide to form a high-quality image using a flat skew mirror coupler. In cases where the eye is accommodated to another focal distance, some blur or other optical effects may be introduced into the image. In some embodiments, the retinal tracking algorithms are robust to this blur. In some embodiments, the amount of blur or the blur kernel may be estimated algorithmically to determine the user's eye accommodation. In some embodiments, other techniques may be applied to retinal gaze tracking using a skew mirror based NED of the type described in connection with FIGS. 1-8. In some embodiments, user identity verification may be performed using the retinal images.

In addition to gaze tracking algorithms, the control circuitry may perform other processing algorithms. In some embodiments, cross correlations among retinal images may be performed. Cross correlations between retinal images taken at different times can be used to estimate the direction and/or magnitude of eye motion in the time interval. In some embodiments, the retinal images may be of a low resolution, or of a reduced resolution compared to the image detector in order to reduce computation. In some examples, the number of cross correlations may be minimized, for example encompassing only single pixel shifts in upward, downward, rightward, and leftward directions. A small number of cross correlations may reduce computation while adequately estimating direction and distance. In some examples, the cross correlation process may resemble those used for optical mouse tracking. A cross correlation process may provide a relative gaze tracking signal. Relative gaze tracking may be used to update an absolute gaze direction estimate by a process of dead reckoning.

Maps representing the retina may be generated and retained for gaze tracking purposes. A retina map may be generated by a calibration algorithm, for instance by instructing the user to gaze upon a series of calibration targets. A retina map may be also generated or updated passively while the user engages in other activities. A retina map may additionally be employed for user identity verification. The gaze tracker may employ image matching techniques to locate the current retinal image within a retina map, thereby determining absolute gaze direction.

The area of the retinal image may be selected so that the optic nerve is viewed when the user is gazing straight ahead. The optic nerve may be a good target for retinal tracking because of its proximity to blood vessels and other coarse features that facilitate image matching. The optic nerve corresponds to the blind spot, and may provide a biologically safer target for illumination by NIR light.

In some embodiments, the control circuitry may combine relative and absolute gaze direction cues to produce a more accurate gaze direction estimate by means of a digital filter. A digital filter may resemble a Kalman filter. A Kalman filter is capable of combining noisy and/or intermittent absolute and relative position signals to produce an estimate of improved accuracy. A Kalman filter may combine intermittent retina map matches with a relative gaze tracking signal in a similar manner. A Kalman filter may make use of other known information, for example, by attaching an increased probability to the prospect that the user is gazing at a display icon in the general vicinity of the current gaze direction estimate.

As mentioned, a flat skew mirror coupler may provide a focused image of a retina through a waveguide when the eye is accommodated at infinity. In some embodiments, a non-flat skew mirror coupler may be employed. For instance, a skew mirror coupler with one diopter of power may produce a focused image of the retina when the eye is accommodated to a focal distance of one meter. An optimal focal depth may be chosen according to the presumed environment, or to a focal depth matching that of displayed AR scenes. In some embodiments, multiple skew mirror couplers are employed in one or more waveguides to provide multiple focal planes.

In cases where eye surface gaze tracking is employed, a highly powered skew mirror coupler with focal length approximately matching the distance from the skew mirror to the eye may be used. For instance, a skew mirror coupler with focal length 25 mm may collimate light emitted from a point on the iris, thus allowing it to propagate through the waveguide as a plane wave and form a sharp image at a photodetector. In other cases an external lens may be used to collimate light emitted from a point on the iris.

In practice, a transparent NED may be unable to occlude real-world scenes with projected ones. Light can typically only be added to the background view, not subtracted. Thus, projected scenes tend to appear transparent, especially darker projected scenes overlaid on brighter background scenes. In some embodiments, this effect may be mitigated by subtracting the background scene from the desired AR scene, and projecting this difference scene rather than the desired scene itself. The user thus sees the superposition of the background and difference scenes, which may more closely resemble the desired scene than had the desired scene been projected directly. For instance, suppose that the desired scene is yellow, but the background contains a band of red. Projecting the yellow scene directly will cause the user to perceive a band of orange (red+yellow=orange). However, subtracting the band of red from the desired yellow scene yields a difference scene with a band of green. This difference scene, when added to the background with the band of red, will produce a uniform yellow scene as desired (red+green=yellow), masking the perception of the red band.

For darker projected scenes overlaid on brighter background scenes, some of the values for the difference scene may be negative. This indicates regions where complete inversion occlusion is not possible since negative luminosity values cannot be projected. In such cases, the control circuitry may truncate negative values to zero. In some embodiments, the control circuitry may apply further processing steps—such as making the desired scene brighter or altering its color—in order to mitigate this limit.

Inversion occlusion requires an estimate of the background scene to be subtracted. In some embodiments, a camera located near the viewer's eyes may provide the background image. However, the parallax effect may introduce differences in viewing angle that degrade the occlusion effect. In some embodiments, reciprocal point of view imaging may be employed to produce background scenes from very near the viewing position of the user's eyes, reducing parallax degradation.

Background images from a camera may be digitally preprocessed in order to improve the occlusion effect. For instance, the color and brightness of the images may be scaled so that the subtracted image optimally matches the color and brightness of the background scene as perceived by the user's eyes. Background scenes may be masked to produce occlusion only in specific AR scene regions. In some examples, background images may be spatially filtered. For example, background images may be spatially low-pass filtered in order to suppress fine details that are unlikely to align well with the real background scene. In cases where reciprocal point of view background images are employed, the images may be filtered to reduce artifacts caused by imaging through a waveguide.

In some applications, reverse waveguide imaging may be employed in systems (including or not including a NED) simply for their ability to collect light from a large aperture. For example, a camera employing a 12 inch skew mirror waveguide coupler might collect as much light as a camera with a 12 inch lens, but in a vastly smaller and likely less-expensive package. In other applications, a reverse waveguide may be employed in non-imaging applications, for example as light collector for illumination, instrumentation, or for solar power generation, as examples.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

While various embodiments have been described and illustrated herein, other means and/or structures for performing the function and/or obtaining the results and/or one or more of the advantages described herein may be used, and each of such variations and/or modifications is deemed to be within the scope of the embodiments described herein. More generally, all parameters, dimensions, materials, and configurations described herein are merely illustrative and actual parameters, dimensions, materials, and/or configurations may depend upon the specific application or applications for which the embodiments is/are used. The embodiments may be practiced in any desired combination. Also, various concepts may be embodied as one or more methods, devices or systems, of which an example has been provided. The acts performed as part of a method or operation may be ordered in any suitable way. Accordingly, embodiments may be constructed in which acts are performed in an order different than illustrated, which may include performing some acts simultaneously, even though shown as sequential acts in embodiments. As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. Transitional phrases such as "comprising," "including," "carrying," "having," "containing," "involving," "holding," "composed of," and the like are to be understood to be open-ended, i.e., to mean including but not limited to. The term "approximately," refers to plus or minus 10% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of volume holographic grating structures and skew mirrors may have a reflective axis that differs from surface normal, or in some cases may have a reflective axis that is coincident with surface normal. A reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, in other words the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, the grating structure is in fact "reflecting" the light by a diffractive mechanism.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single complementary vector pair in k-space (or a substantially point-like complementary pair distribution in k-space). The term "entrance pupil" refers to a real or virtual aperture passing a beam of light, at its minimum size, entering into imaging optics. The term "eye box" refers to a two-dimensional area outlining a region wherein a human pupil may be placed for viewing the full field of view at a fixed distance from a grating structure. The term "eye relief" refers to a fixed distance between a grating structure and a corresponding eye box. The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

In accordance with an embodiment, an optical system for performing gaze tracking is provided that includes a light source configured to emit non-visible light, a waveguide operatively coupled to the light source and having first and second waveguide surfaces, and a volume holographic light coupling element disposed between the first and second waveguide surfaces, where the volume holographic light coupling element includes a grating medium and a volume holographic grating structure within the grating medium, the volume holographic grating structure being configured to reflect the non-visible light about a reflective axis offset from a surface normal of the grating medium.

In accordance with another embodiment, the volume holographic light coupling element is configured to output the non-visible light from the waveguide and to receive a reflected version of the non-visible light that was output from the waveguide, the electronic device further including an imaging device, where the volume holographic light coupling element is configured to direct the reflected version of the non-visible light towards the image device.

In accordance with any combination of the above embodiments, the optical system further includes a polarized beam splitter operatively coupled between the waveguide, the light source, and the imaging device, where the polarized beam splitter is configured to separate the reflected version of the non-visible light from the non-visible light emitted by the light source.

In accordance with any combination of the above embodiments, the optical system further includes a quarter wave plate operatively coupled between the waveguide and the polarized beam splitter, where the quarter wave plate is configured to convey the reflected version of the non-visible light from the waveguide to the polarized beam splitter.

In accordance with any combination of the above embodiment, the light source includes an infrared light source and the non-visible light comprises infrared light.

In accordance with any combination of the above embodiments, the optical system further includes a display operatively coupled to the waveguide and configured to emit visible light, where the volume holographic light coupling element further comprises: an additional volume holographic grating structure within the grating medium, the additional volume holographic grating structure being configured to reflect the visible light about the reflective axis.

In accordance with any combination of the above embodiments, the optical system further includes an optical filter operatively coupled to the waveguide and configured to separate the visible light from the non-visible light.

In accordance with any combination of the above embodiments, the optical filter includes a component selected from the group consisting of: a dichroic filter, a polarizer, and an additional volume holographic light coupling element.

In accordance with any combination of the above embodiments, the optical system further includes an additional imaging device, wherein the volume holographic light coupling element is configured to direct light received from external to the optical system towards the additional imaging device.

In accordance with any combination of the above embodiments, the optical system further includes a display configured to emit visible light, where the volume holographic light coupling element is configured to couple the visible light and the non-visible light into an exit pupil of the optical system, and where the volume holographic light coupling element is configured to expand the exit pupil in two dimensions for the visible light.

In accordance with any combination of the above embodiments, the volume holographic light coupling element is configured to expand the exit pupil in one dimension for the non-visible light.

In accordance with any combination of the above embodiments, the volume holographic light coupling element includes a cross-coupler that expands the exit pupil in two dimensions for the visible light, and wherein the volume holographic light coupling element comprises an output coupler that expands the exit pupil in one dimension for the non-visible light.

In accordance with any combination of the above embodiments, the optical system further includes a display configured to emit visible light, where the volume holographic light coupling element comprises an output coupler and a cross-coupler.

In accordance with any combination of the above embodiments, the waveguide is configured to propagate the non-visible light and the visible light in a given direction, the cross coupler is configured to reflect the visible light into a two-dimensional eye box of the optical system as the visible light propagates through the waveguide, and the output coupler is configured to reflect the non-visible light into the two-dimensional eye box as the non-visible light propagates through the waveguide.

In accordance with an embodiment, an optical system for imaging an external scene is provided that includes a display configured to emit visible light, a volume holographic light coupling element comprising a grating medium and a volume holographic grating structure within the grating medium, the volume holographic grating structure being configured to transmit a first portion of visible light from the external scene and to reflect a second portion of visible light from the external scene about a reflective axis offset from a surface normal of the grating medium at a given incidence angle, and an imaging device operatively coupled to the volume holographic light coupling element, where the imaging device is configured to generate image data in response to the second portion of the visible light reflected by the volume holographic grating structure.

In accordance with another embodiment, the optical system further includes a waveguide having first and second waveguide surfaces, the volume holographic light coupling element being disposed between the first and second waveguide surfaces.

In accordance with any combination of the above embodiments, the volume holographic grating structure is further configured to reflect non-visible light about the reflective axis.

In accordance an embodiment, an electronic device is provided that includes an eye box, a light source configured to emit non-visible light, a display configured to emit visible light, a waveguide operatively coupled to the light source and the display and having first and second waveguide surfaces, and a light coupling element disposed between the first and second waveguide surfaces, where the light coupling element is configured to direct the visible light and the non-visible light towards the eye box, and the light coupling element includes a medium, a first volume holographic grating structure within the medium, the first volume holographic grating structure being configured to reflect the non-visible light about a first reflective axis offset from a surface normal of the medium at a first incidence angle, and a second volume holographic grating structure within the grating medium and at least partially overlapping the first volume hologram, the second volume holographic grating structure being configured to reflect the visible light about a second reflective axis offset from the surface normal of the medium at a second incidence angle that is different from the first incidence angle.

In accordance with another embodiment, the electronic device further includes an imaging device, where the light coupling element is configured to receive a reflected version of the non-visible light that has been coupled into the waveguide from the eye box, the light coupling element is configured to direct the reflected version of the non-visible light towards the imaging device, and the imaging device is configured to gather image data in response to the reflected version of the non-visible light.

In accordance with any combination of the above embodiments, the electronic device further includes an optical filter operatively coupled to the waveguide, where the optical filter is configured to direct the non-visible light emitted by the light source towards the waveguide, to direct the reflected version of the non-visible light towards the imaging device, and to direct the visible light from the display to the waveguide.

The foregoing is merely illustrative and various modifications can be made to the described embodiments. The foregoing embodiments may be implemented individually or in any combination.

What is claimed is:

1. An electronic device comprising:
   a light source configured to emit non-visible light;
   a display configured to emit visible light;
   a waveguide having first and second waveguide substrates, the first waveguide substrate having opposing first and second lateral surfaces, the second waveguide substrate having opposing third and fourth lateral surfaces parallel to the first and second lateral surfaces; and
   an optical coupler disposed on the waveguide and comprising:
      a grating medium disposed between the first and second waveguide substrates and contacting the second and third lateral surfaces,
      a first volume holographic grating structure within the grating medium, the first volume holographic grating structure being configured to reflect the non-visible light about a reflective axis offset from a surface normal of the grating medium, and
      a second volume holographic grating structure superimposed with the first volume holographic grating structure in the grating medium, the second volume holographic grating structure being configured to reflect the visible light about the reflective axis.

2. The electronic device of claim 1, wherein the optical coupler is configured to output the non-visible light from the waveguide and to receive a reflected version of the non-visible light that was output from the waveguide, the optical system further comprising:
   a camera, wherein the optical coupler is configured to direct the reflected version of the non-visible light towards the camera.

3. The electronic device of claim 2, further comprising:
   a polarized beam splitter optically coupled between the waveguide, the light source, and the camera, wherein the polarized beam splitter is configured to separate the reflected version of the non-visible light from the non-visible light emitted by the light source.

4. The electronic device of claim 3, further comprising:
   a quarter wave plate optically coupled between the waveguide and the polarized beam splitter, wherein the quarter wave plate is configured to convey the reflected version of the non-visible light from the waveguide to the polarized beam splitter.

5. The electronic device of claim 2, wherein the light source comprises an infrared light source and the non-visible light comprises infrared light.

6. The electronic device of claim 2, further comprising:
   an optical filter optically coupled to the waveguide and configured to separate the visible light from the non-visible light.

7. The electronic device of claim 6, wherein the optical filter comprises a component selected from the group consisting of: a dichroic filter, a polarizer, and an additional optical coupler.

8. The electronic device of claim 2, further comprising:
   an additional camera, wherein the optical coupler is configured to direct external scene light towards the additional camera.

9. The electronic device of claim 2, wherein the optical coupler is configured to couple the visible light and the non-visible light into an exit pupil of the optical system, and wherein the optical coupler is configured to expand the exit pupil in two dimensions for the visible light.

10. The electronic device of claim 9, wherein the optical coupler is configured to expand the exit pupil in one dimension for the non-visible light.

11. The electronic device of claim 10, wherein the optical coupler comprises a cross-coupler that expands the exit pupil in two dimensions for the visible light, and wherein the optical coupler comprises an output coupler that expands the exit pupil in one dimension for the non-visible light.

12. The electronic device of claim 1, wherein the optical coupler comprises an output coupler and a cross-coupler.

13. The electronic device of claim 12, wherein the waveguide is configured to propagate the non-visible light and the visible light in a given direction, the cross coupler is configured to reflect the visible light into a two-dimensional box of the optical system as the visible light propagates through the waveguide, and the output coupler is configured to reflect the non-visible light into the two-dimensional box as the non-visible light propagates through the waveguide.

14. The electronic device of claim 1, further comprising:
   a lens external to the waveguide and configured to direct the visible light from the display and the non-visible light from the light source towards the waveguide; and
   an imaging device, wherein the optical coupler is configured to receive a reflected version of the non-visible light that has been coupled into the waveguide and is configured to direct the reflected version of the non-visible light towards the imaging device, the imaging device being configured to gather image data in response to the reflected version of the non-visible light.

15. The electronic device of claim 14, further comprising:
   an optical filter operatively coupled to the waveguide, the optical filter being configured to:
      reflect the non-visible light emitted by the light source towards the lens,
      reflect the reflected version of the non-visible light towards the imaging device, and
      transmit the visible light from the display to the lens.

16. An electronic device comprising:
   a light source configured to emit non-visible light;
   a waveguide having first and second substrates, the first substrate having opposing first and second lateral surfaces and the second substrate having opposing third and fourth lateral surfaces extending parallel to the first and second lateral surfaces; and
   an optical coupler disposed in the waveguide, the optical coupler comprising:
      a grating medium disposed between the first and second substrates, the grating medium being in contact with the second and third lateral surfaces, and
      one or more volume holograms within the grating medium, the one or more volume holograms structure being configured to reflect the non-visible light about a reflective axis offset from a surface normal of the grating medium.

* * * * *